(12) United States Patent
Mori et al.

(10) Patent No.: US 12,339,389 B2
(45) Date of Patent: Jun. 24, 2025

(54) RADAR DEVICE AND RADAR SYSTEM

(71) Applicant: KABUSHIKI KAISHA TOSHIBA, Tokyo (JP)

(72) Inventors: Hiroki Mori, Kanagawa (JP); Xu Zhu, Kanagawa (JP); Hiroshi Yoshida, Kanagawa (JP); Koh Hashimoto, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 647 days.

(21) Appl. No.: 17/685,947

(22) Filed: Mar. 3, 2022

(65) Prior Publication Data

US 2022/0404457 A1 Dec. 22, 2022

(30) Foreign Application Priority Data

Jun. 17, 2021 (JP) ................. 2021-100700

(51) Int. Cl.
*G01S 7/03* (2006.01)
*H01Q 21/00* (2006.01)

(52) U.S. Cl.
CPC ......... *G01S 7/032* (2013.01); *H01Q 21/0006* (2013.01)

(58) Field of Classification Search
CPC ............................ G01S 7/032; H01Q 21/0006
USPC ....................................................... 342/175
See application file for complete search history.

(56) References Cited

U.S. PATENT DOCUMENTS

| 7,079,073 | B2 * | 7/2006 | Fujita | G01S 7/4026 342/174 |
|---|---|---|---|---|
| 7,612,706 | B2 * | 11/2009 | Honda | H01Q 25/02 342/107 |
| 8,140,113 | B2 * | 3/2012 | Rofougaran | H01P 1/20372 455/81 |
| 8,369,390 | B2 * | 2/2013 | Rofougaran | H01Q 23/00 370/276 |
| 8,866,664 | B2 * | 10/2014 | Yamada | G01S 13/87 342/70 |
| 10,132,918 | B2 * | 11/2018 | Wada | G01S 7/282 |
| 10,283,874 | B2 * | 5/2019 | Tsuchiya | H01Q 21/065 |
| 10,401,487 | B2 * | 9/2019 | Lim | G01S 7/352 |

(Continued)

FOREIGN PATENT DOCUMENTS

| JP | 2018157609 A | 10/2018 |
|---|---|---|
| JP | 2018537679 A | 12/2018 |

(Continued)

OTHER PUBLICATIONS

Texas Instruments, "Design Guide: TIDEP-01012—Imaging Radar Using Cascaded mmWave Sensor Reference Design", Mar. 2020, 36 pages.

*Primary Examiner* — Nuzhat Pervin

(74) *Attorney, Agent, or Firm* — Holtz, Holtz & Volek PC

(57) ABSTRACT

According to one embodiment, a radar device includes a transmission module including a transmission antenna and first integrated circuits, a reception module including a reception antenna and second integrated circuits, and a third integrated circuit. Each of the first integrated circuits includes first transmission circuits, first reception circuits, and a first signal generation circuit. Each of the second integrated circuits includes second transmission circuits, second reception circuits, and a second signal generation circuit. The third integrated circuit includes third transmission circuits, third reception circuits, and a third signal generation circuit.

16 Claims, 12 Drawing Sheets

(56) References Cited

U.S. PATENT DOCUMENTS

| | | | |
|---|---|---|---|
| 10,403,964 B2* | 9/2019 | Yoo | H01Q 5/371 |
| 10,578,707 B2* | 3/2020 | Kim | G01S 13/931 |
| 10,782,389 B2* | 9/2020 | Rao | G01S 13/343 |
| 11,296,745 B2* | 4/2022 | Shimura | H01Q 1/241 |
| 11,309,977 B2* | 4/2022 | Tang | H04B 17/12 |
| 11,415,450 B2* | 8/2022 | Waelde | H01Q 15/08 |
| 11,500,059 B2* | 11/2022 | Kambe | G01S 13/931 |
| 11,532,869 B2* | 12/2022 | Spalink | H01Q 21/08 |
| 11,719,802 B2* | 8/2023 | Starzer | G01S 7/032 |
| | | | 455/314 |
| 11,733,365 B2* | 8/2023 | Mayer | G01S 13/87 |
| | | | 342/200 |
| 11,782,148 B2* | 10/2023 | Subburaj | G01S 7/352 |
| | | | 342/109 |
| 11,796,628 B2* | 10/2023 | Nayyar | G01S 13/42 |
| 11,892,557 B2* | 2/2024 | Kitamura | G01S 13/931 |
| 2009/0046000 A1* | 2/2009 | Matsuoka | H01Q 3/26 |
| | | | 342/147 |
| 2016/0018511 A1* | 1/2016 | Nayyar | G01S 7/03 |
| | | | 342/27 |
| 2016/0187479 A1* | 6/2016 | Shibata | G01S 13/325 |
| | | | 342/59 |
| 2017/0146648 A1* | 5/2017 | Lim | G01S 13/584 |
| 2017/0214427 A1* | 7/2017 | Chayat | H04B 17/12 |
| 2017/0227636 A1* | 8/2017 | Moulder | G01S 13/89 |
| 2017/0234971 A1* | 8/2017 | Arai | H04B 17/12 |
| | | | 342/174 |
| 2017/0261597 A1* | 9/2017 | Wada | H01Q 21/0006 |
| 2018/0351261 A1* | 12/2018 | Kamo | H01Q 21/064 |
| 2019/0129002 A1* | 5/2019 | Roger | G01S 7/2927 |
| 2019/0195984 A1* | 6/2019 | Goda | G01S 13/931 |
| 2020/0256947 A1* | 8/2020 | Motoda | G01S 7/032 |
| 2021/0109193 A1* | 4/2021 | Tsutsumi | G01S 13/343 |
| 2021/0181329 A1* | 6/2021 | Kashiwagi | G01S 13/343 |
| 2022/0349992 A1* | 11/2022 | Tsutsumi | G01S 7/4069 |
| 2022/0390551 A1* | 12/2022 | You | G01S 13/931 |
| 2023/0032399 A1* | 2/2023 | Kashiwagi | G01S 13/42 |
| 2023/0036918 A1* | 2/2023 | Arakawa | G01S 13/42 |
| 2023/0069118 A1* | 3/2023 | Zhu | H01Q 21/061 |
| 2023/0115807 A1* | 4/2023 | Bunsen | G01S 13/343 |
| | | | 342/128 |

FOREIGN PATENT DOCUMENTS

| | | | | |
|---|---|---|---|---|
| JP | 2019078756 A | 5/2019 | | |
| JP | 2020106294 A | 7/2020 | | |
| WO | WO-2020157915 A1 * | 8/2020 | | G01S 7/02 |

* cited by examiner

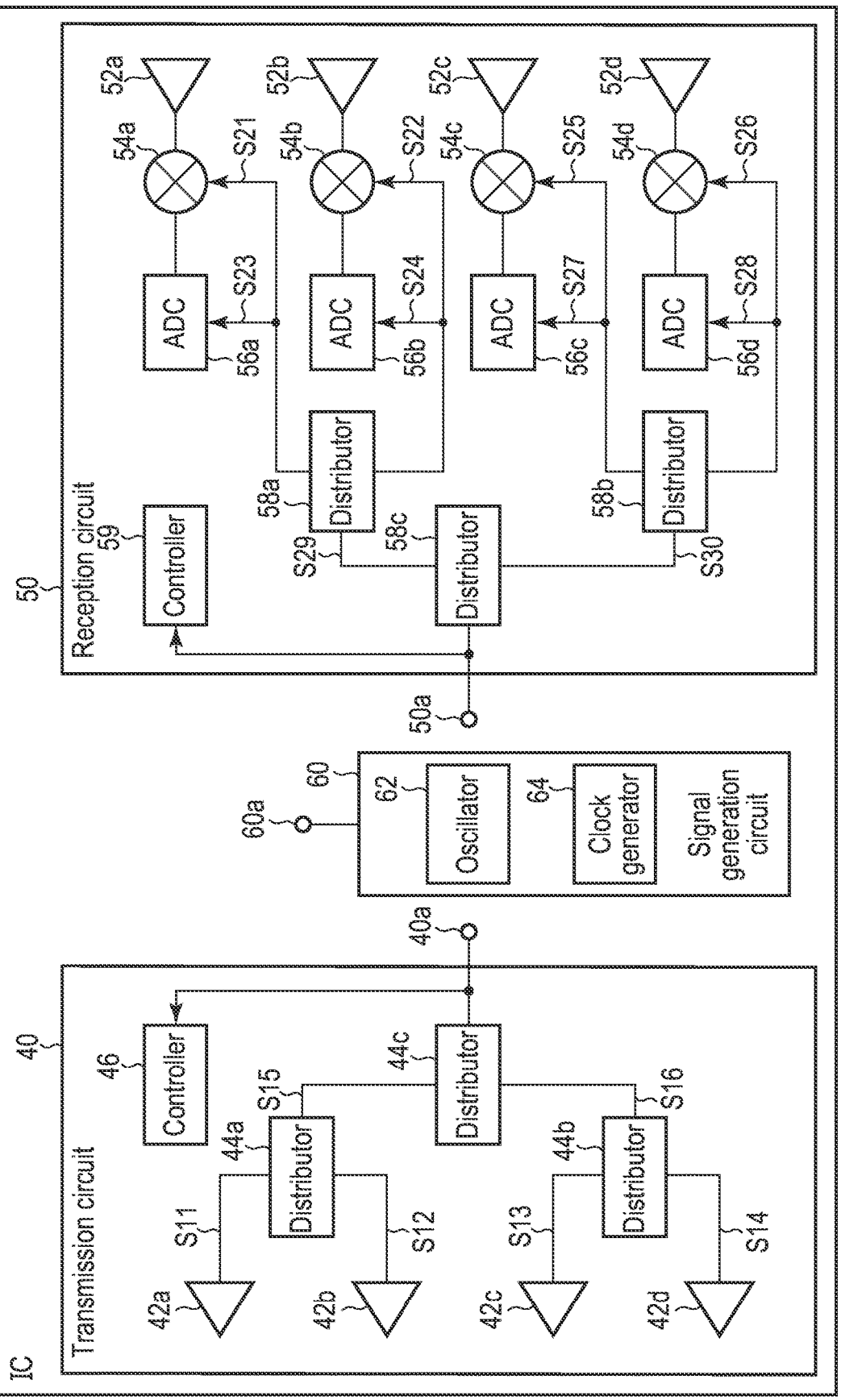
F I G. 2

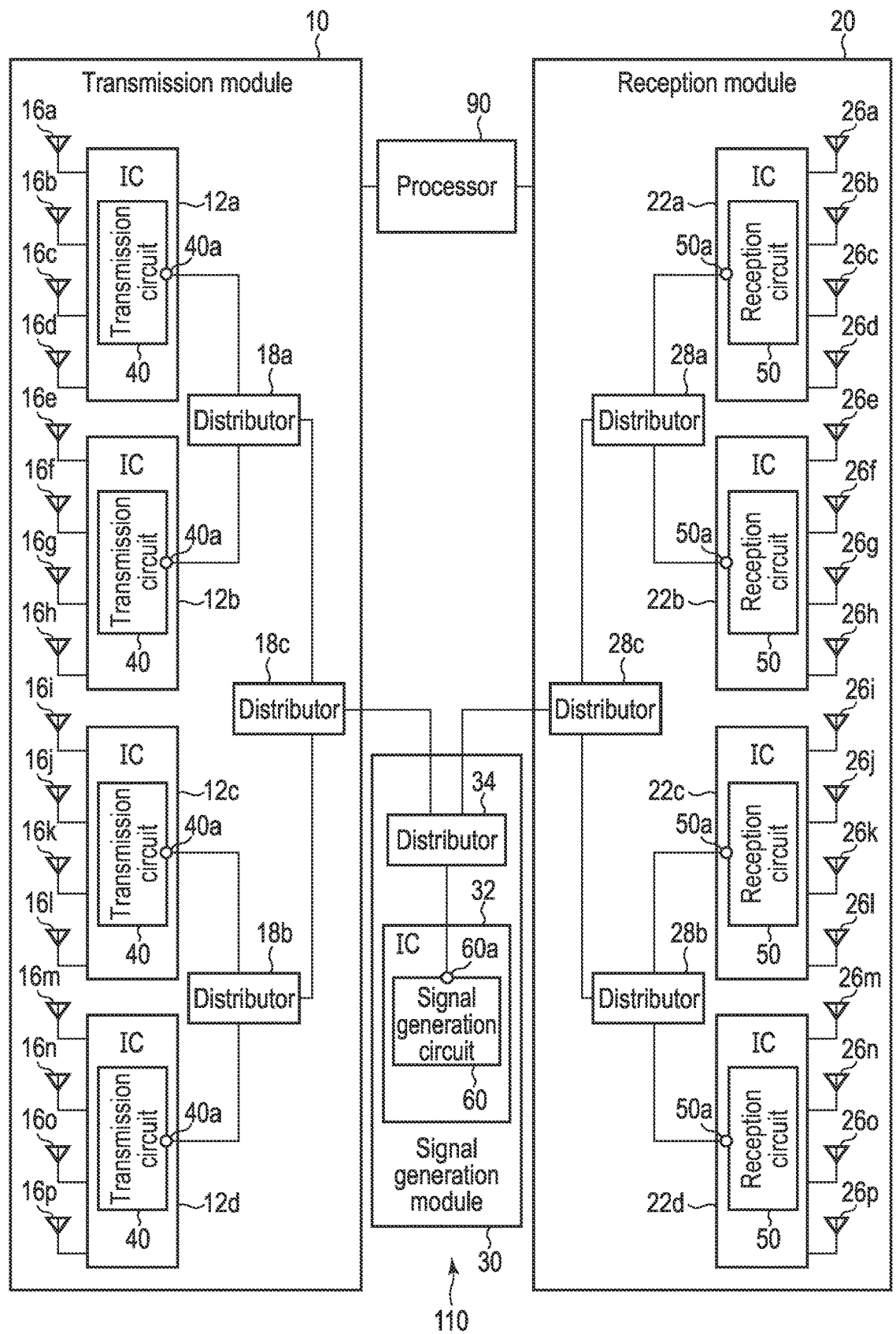
F I G. 3

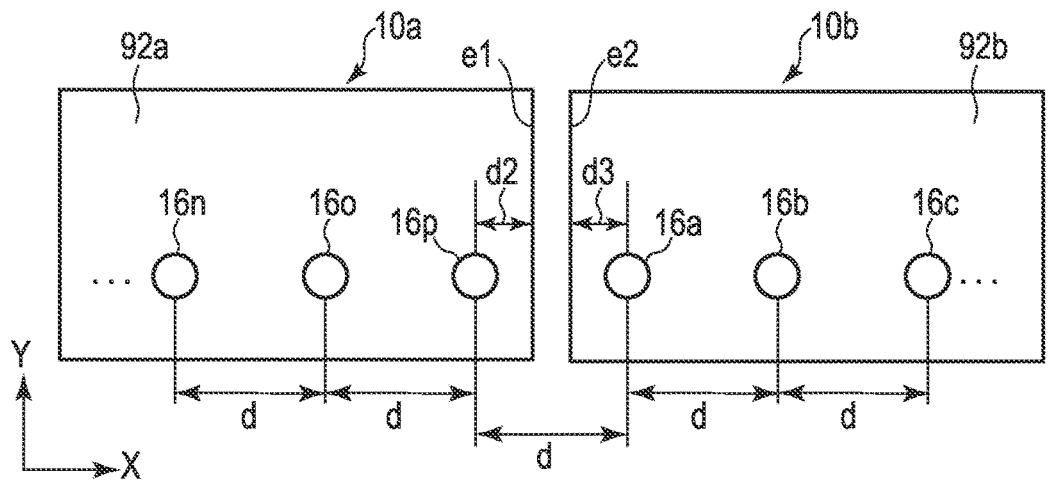
F I G. 9
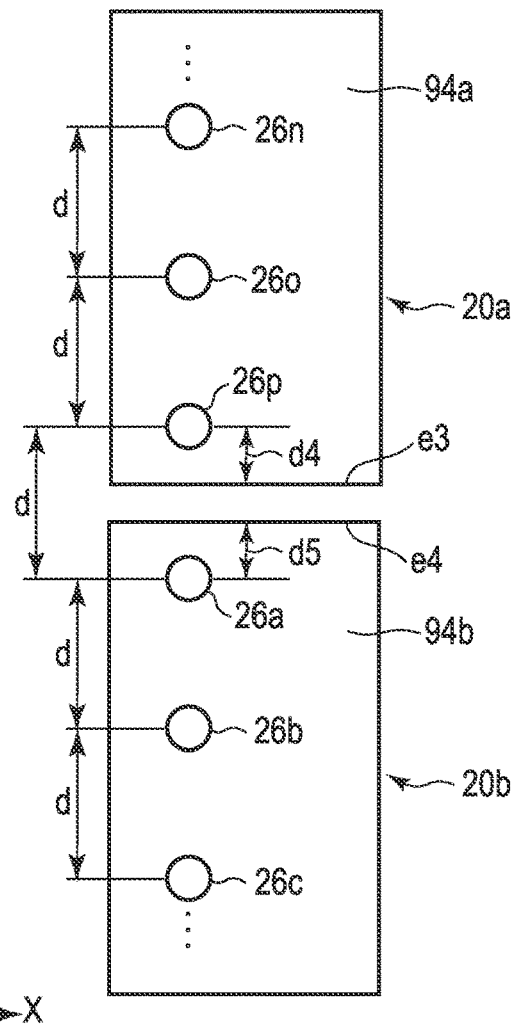
F I G. 10

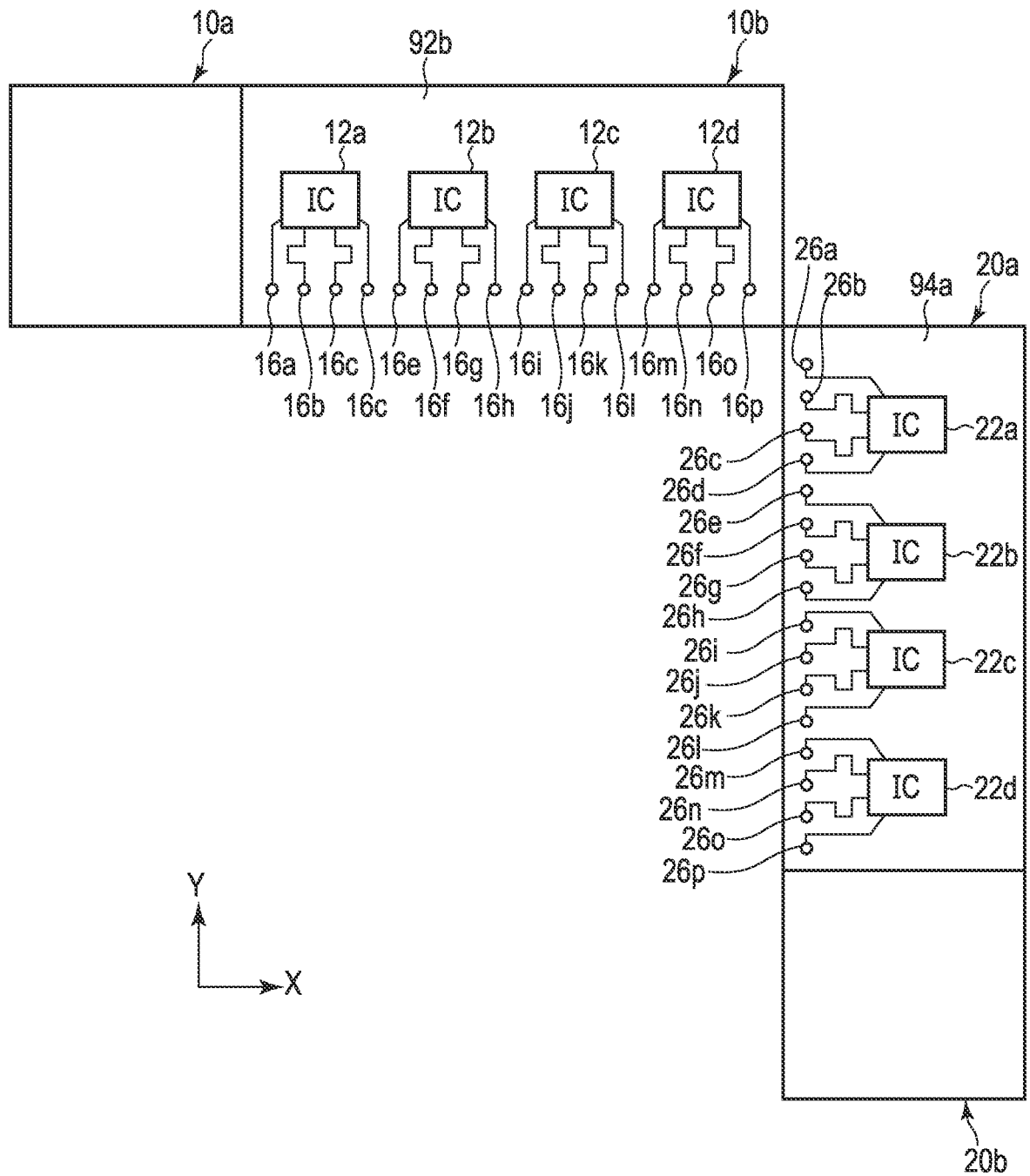
F I G. 13

RADAR DEVICE AND RADAR SYSTEM

CROSS-REFERENCE TO RELATED APPLICATIONS

This application is based upon and claims the benefit of priority from Japanese Patent Application No. 2021-100700, filed Jun. 17, 2021, the entire content of which are incorporated herein by reference.

FIELD

Embodiments described herein relate generally to a radar device and a radar system.

BACKGROUND

An integrated circuit having radar functions has been commercialized. A radar device can be formed at low costs by using the integrated circuit. The radar device is expected to be applied to various fields such as automobiles, non-destructive inspection, medicine, and security. The number of antennas that can be mounted on the integrated circuit is small. Therefore, expansion of an aperture length of an array antenna is limited and it is difficult to increase a spatial resolution of the radar device.

BRIEF DESCRIPTION OF THE DRAWINGS

FIG. 2 is a circuit diagram illustrating an example of an integrated circuit in a transmission module and reception module of a radar device according to the first embodiment.

FIG. 3 is a circuit diagram illustrating a detailed example of a radar device according to the first embodiment.

FIG. 9 is a view illustrating an example of arrangement of transmission antenna elements according to the second embodiment.

FIG. 10 is a view illustrating an example of arrangement of reception antenna elements according to the second embodiment.

FIG. 13 illustrates another example of a feeding method of a radar device according to the second embodiment.

DETAILED DESCRIPTION

Figure 1:
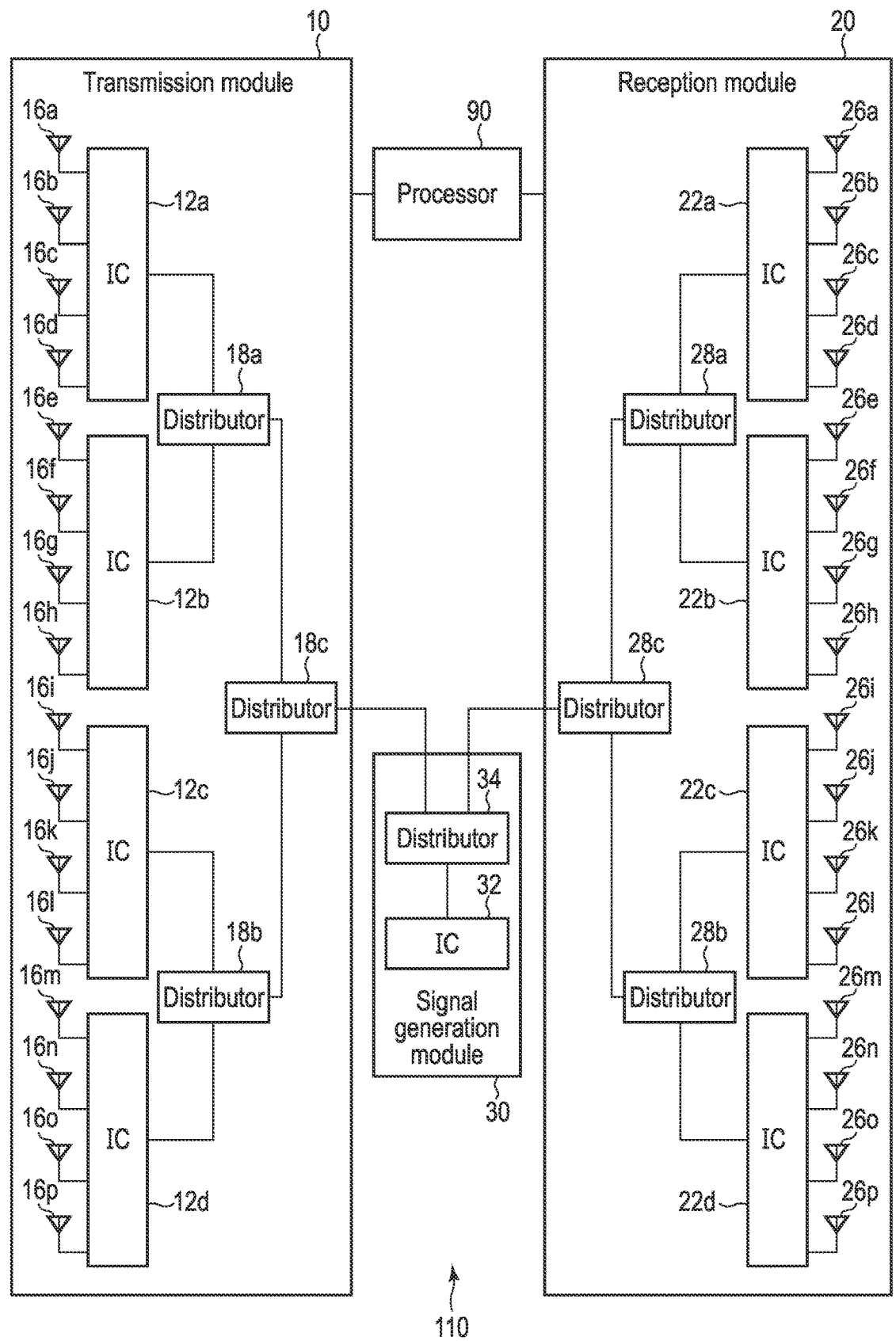
FIG. 1 is a circuit diagram illustrating an example of a radar device according to a first embodiment.

Various embodiments will be described hereinafter with reference to the accompanying drawings.

The disclosure is merely an example and is not limited by contents described according to the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a radar device includes a transmission module comprising a transmission antenna and first integrated circuits; a reception module comprising a reception antenna and second integrated circuits; and a third Integrated circuit. Each of the first integrated circuits includes first transmission circuits, first reception circuits, and a first signal generation circuit. Each of the second integrated circuits includes second transmission circuits, second reception circuits, and a second signal generation circuit. The third integrated circuit includes third transmission circuits, third reception circuits, and a third signal generation circuit.

First Embodiment

A radar device according to a first embodiment will be described with reference to FIG. 1 to FIG. 6.

FIG. 1 is a circuit diagram illustrating an example of a radar device 110 according to the first embodiment. The radar device 110 includes a transmission module 10, reception module 20, and signal generation module 30. A processor 90 of higher level is connected to the radar device 110.

The signal generation module 30 includes an integrated circuit (hereinafter referred to as IC) 32 having a radar function of a linear frequency modulated continuous wave (L-FMCW) system by which a frequency increases linearly with the passage of time, and a distributor 34. The IC 32 generates an L-FMCW signal (also referred to as a chirp signal) and a clock signal. The distributor 34 distributes an input signal to two output terminals to output the signals from the signal generation module 30. The distributor 34 supplies the chirp signal and the clock signal to the transmission module 10 and the reception module 20.

The transmission module 10 includes ICs 12a, 12b, 12c, and 12d having the radar function of the L-FMCW system, a transmission array antenna, and distributors 18a, 18b, and 18c. The number of ICs is not limited to four, but may be any number as long as it is more than one. The transmission array antenna includes a plurality of transmission antenna elements 16a, 16b, 16c, 16d, 16e, 16f, 16g, 16h, 16i, 16j, 16k, 16l, 16m, 16n, 16o, and 16p. An example of each of the transmission antenna elements 16a to 16p is a patch antenna. Four transmission antenna elements are connected to four ICs 12a to 12d, respectively. For example, the transmission antenna elements 16a to 16d are connected to the IC 12a, the transmission antenna elements 16e to 16h are connected to the IC 12b, the transmission antenna elements 16i to 16l are connected to the IC 12c, and the transmission antenna elements 16m to 16p are connected to the IC 12d.

The number of transmission antenna elements connected to each of IC 12a to 12d is not limited to four, but may be two, six or more, or an odd number. Adjacent antenna elements (for example, 16a and 16b) of the transmission antenna elements 16a to 16p may be set to be spaced with a uniform interval or may be set to be spaced with a plurality of intervals in coprime relationship. An example of a uniform interval is one wavelength or a half wavelength.

The distributor 18c outputs the chirp signal and the clock signal from the signal generation module 30 to the distributors 18a and 18b. The distributor 18a outputs the chirp signal and the clock signal from the distributor 18c to the ICs 12a and 12b. The distributer 18b outputs the chirp signal and the clock signal from the distributer 18c to the ICs 12c and 12d. Each of the ICs 12a to 12d transmits an electromagnetic wave, according to the chirp signal, from the transmission array antenna to an inspection target (hereinafter, referred to as an object). The ICs 12a to 12d operate in synchronization with the clock signal.

The reception module 20 includes ICs 22a, 22b, 22c, and 22d having the L-FMCW radar function, reception array antenna, and distributors 28a, 28b, and 28c. The number of ICs is not limited to four, but may be any number as long as it is more than one. The reception array antenna includes a plurality of reception antenna elements 26a, 26b, 26c, 26d, 26e, 26f, 26g, 26h, 26i, 26j, 26k, 26l, 26m, 26n, 26o, and 26p. An example of each of the reception antenna elements 26a to 26p is a patch antenna. Four reception antenna elements are connected to four ICs 22a to 22d, respectively. For example, the reception antenna elements 26a to 26d are connected to the IC 22a, the reception antenna elements 26e to 26h are connected to the IC 22b, the reception antenna elements 26i to 26l are connected to the IC 22c, and the reception antenna elements 26m to 26p are connected to the IC 22d.

The number of reception antenna elements connected to each of IC 22a to 22d is not limited to four, but may be two, six or more, or an odd number. Adjacent antenna elements (for example, 26a and 26b) of the reception antenna elements 26a to 26p may be set to be spaced with a uniform interval or may be set to be spaced with a plurality of intervals in coprime relationship. An example of a uniform interval is one wavelength or a half wavelength. Furthermore, the uniform interval between the transmission antenna elements may be different from the uniform interval between the reception antenna elements.

The distributor 28c outputs the chirp signal and the clock signal from the signal generation module 30 to the distributors 28a and 28b. The distributor 28a outputs the chirp signal and the clock signal from the distributor 28c to the ICs 22a and 22b. The distributor 28b outputs the chirp signal and the clock signal from the distributor 28c to the ICs 22c and 22d. Each of the ICs 22a to 22d receives an electromagnetic wave reflected from an object by the receiving array antenna. The ICs 12s to 12d operate in synchronization with the clock signal.

The transmission module 10 and the reception module 20 are connected to the processor 90. The processor 90 performs beamforming of a transmission beam and a reception beam. The processor 90 performs initial settings and timing control of the transmission module 10. The processor 90 can detect the presence or absence of an object, the direction of an object, the distance to an object, whether or not an object is carrying a dangerous material, and the like, and can also display an image of an object by performing array signal processing of the reception signal.

The spatial resolution required for direction estimation and image display of the radar device 110 using the array antenna is determined depending on the number of antenna elements. Only a limited number of antenna elements can be connected to a single IC having the radar function, and the spatial embodiment, a plurality of ICs, for example, four ICs 12a to 12d are connected in series to implement a transmission array antenna including sixteen antenna elements and four ICs 22a to 22d are connected in series to implement a reception array antenna including sixteen antenna elements. The spatial resolution of the radar device 110 can be increased by a factor of four as compared to a case of using one IC.

Dedicated ICs may be used as the ICs 12a to 12d, ICs 22a to 22d, and IC 32, but a common IC may be used. FIG. 2 is a circuit diagram illustrating an example of the common IC used as each of the ICs 12a to 12d, ICs 22a to 22d, and IC 32. Each of the ICs 12a to 12d, ICs 22a to 22d, and IC 32 includes a transmission circuit 40, a reception circuit 50, and a signal generation circuit 60.

The signal generation circuit 60 includes an oscillator 62 and a clock generator 64. The oscillator 62 generates the chirp signal. The chirp signal from the oscillator 62 and the clock signal from the clock generator 64 are output to the outside of the IC via an output terminal 60a.

The transmission circuit 40 includes transmission amplifiers 42a, 42b, 42c, and 42d, distributors 44a, 44b, and 44c, and a controller 46. The chirp signal and clock signal are input from the outside of the IC to an input terminal 40a.

The clock signal is input to the controller 46. The controller 46 controls the transmission timing of the transmission circuit 40, based on the clock signal. The chirp signal is input to the distributor 44c. The distributor 44c outputs the chirp signal to the distributors 44a and 44b. The distributor 44a outputs the chirp signal from the distributor 44c to the transmission amplifiers 42a and 42b. The distributer 44b outputs the chirp signal from the distributer 44c to the transmission amplifiers 42c and 42d.

The transmission amplifiers 42a to 42d are connected to four antenna elements, respectively. Electromagnetic waves corresponding to the chirp signals are thereby transmitted from the transmission antenna elements. Furthermore, phase shifters may be provided in the latter stage of the distributors 44a and 44b, the phases of RF signals supplied to transmission antenna elements may be adjusted, and beamforming of the transmission beam may be performed.

As the electromagnetic wave used according to the embodiment, an electromagnetic wave having a wavelength of from 1 mm to 30 mm may be utilized. An electromagnetic wave having a wavelength of 1 to 10 millimeters is referred to as a millimeter wave. An electromagnetic wave having a wavelength of 10 to 100 millimeters is referred to as a microwave. Furthermore, an electromagnetic wave having a wavelength of 100 micrometers to 1 millimeter, referred to as a terahertz wave, may be used.

The distributor 44a is placed at a position substantially equidistant from the transmission amplifiers 42a and 42b. Therefore, a length of a signal line S11 between the distributor 44a and the transmission amplifier 42a can easily be made substantially equal to a length of a signal line S12 between the distributor 44a and the transmission amplifier 42b. The distributor 44b is placed at a position substantially equidistant from the transmission amplifiers 42c and 42d. Therefore, a length of a signal line S13 between the distributor 44b and the transmission amplifier 42c can easily be made substantially equal to a length of a signal line S14 between the distributor 44b and the transmission amplifier 42d. The distributor 44c is placed at a position substantially equidistant from the distributors 44a and 44b. Therefore, a length of a signal, line S15 between the distributors 44c and 44a can easily be made substantially equal to a length of a signal line S16 between the distributors 44c and 44b.

The lengths of the signal lines between the input terminal 40*a* and four transmission amplifiers 42*a* to 42*d* can easily be made substantially equal by thus dividing the signal from the input terminal 40*a* into two signals by the distributor 44*c* and further dividing each of the two divisional signals into two signals. As a result, variation in the transmission delay of the four chirp signals input to the four transmission amplifiers 42*a* to 42*d*, respectively, can be suppressed and the directivity of the transmission array antenna can be accurately controlled. If the signal from the input terminal 40*a* is divided into four signals by one distributor, the signal lines need to be routed to make the lengths of four signal lines equal and the degree of integration of the IC cannot be increased.

The reception circuit 50 includes reception amplifiers 52*a*, 52*b*, 52*c*, and 52*d*, mixers 54*a*, 54*b*, 54*c*, and 54*d*, A/D converters (ADC) 56*a*, 56*b*, 56*c*, and 56*d*, distributors 58*a*, 58*b*, and 56*c*, and a controller 59. A chirp signal and a clock signal are input from the outside of the IC to an input terminal 50*a*.

The clock signal is input to the controller 59. The controller 59 controls the reception timing of the reception circuit 50, based on the clock signal. Operations of the transmission circuit 40 and the reception circuit 50 are thereby synchronized.

The chirp signal is input to the distributor 58*c*. Four reception antenna elements are connected to the reception amplifiers 52*a* to 52*d*, respectively. Although not shown in the figures, the phase of outputs of the reception amplifiers 52*a* to 52*d* may be adjusted by phase shifters, and the directivity of the reception array antenna may be varied. The outputs of the reception amplifiers 52*a* to 52*d* are supplied to the ADCs 56*a* to 56*d* via mixers 54*a* to 54*d*, respectively. The distributor 58*c* distributes the chirp signal and the clock signal from an input terminal 50*a* to the distributors 58*a* and 58*b*. The distributer 58*a* outputs the chirp signal from the distributer 58*c* to the mixers 54*a* and 54*b* and also outputs the clock signal from the distributor 58*c* to the ADCs 56*a* and 56*b*. The distributer 58*b* outputs the chirp signal from the distributer 58*c* to the mixers 54*c* and 54*d* and also outputs the clock signal from the distributor 58*c* to the ADCs 56*c* and 56*d*. The mixers 54*a* to 54*d* use the chirp signals to convert RF signals from the reception amplifiers 52*a* to 52*d* into IF-band reception signals. The ADCs 56*a* to 56*d* convert the IF-band reception signals into digital signals in synchronization with the clock signals. The digital signals from the ADCs 56*a* to 56*d* are supplied to the processor 90 via output terminals (not shown).

The distributor 58*a* is placed at a position substantially equidistant from the mixers 54*a* and 54*b* and a position substantially equidistant from the ADCs 56*a* and 56*b*. Therefore, a length of a signal line S21 between the distributor 58*a* and the mixer 54*a* can easily be made substantially equal to a length of a signal line 322 between the distributor 58*a* and the mixer 54*b*, and a length of a signal line S23 between the distributor 58*a* and the ADC 56*a* can easily be made substantially equal to a length of a signal line S24 between the distributor 58*a* and the ADC 56*b*.

The distributor 58*b* is placed at a position substantially equidistant from the mixers 54*c* and 54*d* and a position substantially equidistant from the ADCs 56*c* and 56*d*. Therefore, a length of a signal line S25 between the distributor 58*b* and the mixer 54*c* can easily be made substantially equal to a length of a signal line S26 between the distributor 58*b* and the mixer 54*d*, and a length of a signal line S27 between the distributor 58*b* and the ADC 56*c* can easily be made substantially equal to a length of a signal line S28 between the distributor 58*b* and the ADC 56*d*.

The distributor 58*c* is placed at a position substantially equidistant from the distributors 58*a* and 58*b*. Therefore, a length of a signal line S29 between the distributors 58*c* and 58*a* is easily made substantially equal to a length of a signal line S30 between the distributors 58*c* and 58*b*.

The lengths of the signal lines between the input terminal 50*a* and four mixers 54*a* to 54*d* can easily be made substantially equal and the lengths of the signal lines between the input terminal 50*a* and four ADCs 56*a* to 56*d* can easily be made substantially equal, by thus dividing the signal from the input terminal 40*a* into two signals by the distributor 58*c* and further dividing each of the two divisional signals into two signals. As a result, variation in the transmission delay of four chirp signals input to the four mixers 54*a* to 54*d* can be suppressed and the RF signals can be converted into IF signals without phase shift. Furthermore, variation in the timing shift of the four clock signals that are input to the four ADCs 56*a* to 56*d*, respectively, can be suppressed, and the IF signals can be converted into digital signals at the correct timing. If the signal from the input terminal 50*a* is divided into four signals, the signal lines need to be routed to make the lengths of the four signal lines equal and the degree of integration of the integrated circuit cannot be increased.

FIG. 3 is a circuit diagram specifically illustrating the radar device 110. As shown in FIG. 2, each of the ICs 12*a* to 12*d*, ICs 22*a* to 22*d* and IC 32 is formed of the same IC including the three circuits 40, 50, and 60. However, all the ICs 12*a* to 12*d*, ICs 22*a* to 22*d*, and IC 32 do not require three circuits 40, 50, and 60. Each of the ICs 12*a* to 12*d* in the transmission module 10 requires the transmission circuit 40, but does not require the reception circuit 50 and the signal generation circuit 60. Each of the ICs 22*a* to 22*d* in the reception module 20 requires the reception circuit 50, but does not require the transmission circuit 40 and the signal generator circuit 60. The IC 32 in the signal generation module 30 requires the signal generation circuit 60, but does not require the transmission circuit 40 and the reception circuit 50.

Therefore, in the IC 32 in the signal generation module 30, the input terminal 40*a* of the transmission circuit 40 and the input terminal 50*a* of the reception circuit 50 are not connected to the outside of the IC 32, and the output terminal 60*a* of the signal generation circuit 60 is connected to the distributor 34. As a result, the chirp signal from the oscillator 62 in the IC 32 is supplied to the transmission module 10 and the reception module 20 via the distributor 34, and the clock signal from the clock generator 64 in the IC 32 is supplied to the transmission module 10 and the reception module 20 via the distributor 34.

In each of the ICs 12*a* to 12*d* in the transmission module 10, the input terminal 50*a* of the reception circuit 50 and the output terminal 60*a* of the signal generator circuit 60 are not connected to other ICs, and the input terminal 60*a* of the transmission circuit 40 is connected to the distributors 18*a* and 18*b*. As a result, the chirp signal and clock signal input from the signal generation module 30 to each of the ICs 12*a* to 12*d* via the distributors 18*c*, 18*a*, and 18*b* are input to the transmission circuit 40. Each of the ICs 12*a* to 12*d* transmits an electromagnetic wave corresponding to the chirp signal to an object via the transmission array antenna by the operation of the transmission circuits 40. The electromagnetic wave reflected on the object is received by the reception array antenna formed of the reception antenna elements 26*a* to 26*p*.

In each of the ICs 22a to 22d in the reception module 20, the input terminal 40a of the transmission circuit 40 and the output terminal 60a of the signal generator circuit 60 are not connected to other ICs, and the input terminal 50a of the reception circuit 50 is connected to the distributors 28a and 28b. As a result, the chirp signal and clock signal input from the signal generation module 30 to each of the ICs 22a to 22d via the distributors 28c, 28a, and 28b are input to the reception circuit 50. Each of the ICs 22a to 22d converts the signal received by the antenna elements 26a to 26p into an IF signal and converts the IF signal into a digital signal by the operation of the reception circuit 50. Each of the ICs 22a to 22d supplies the digital signal to the processor 90.

Figure 4:
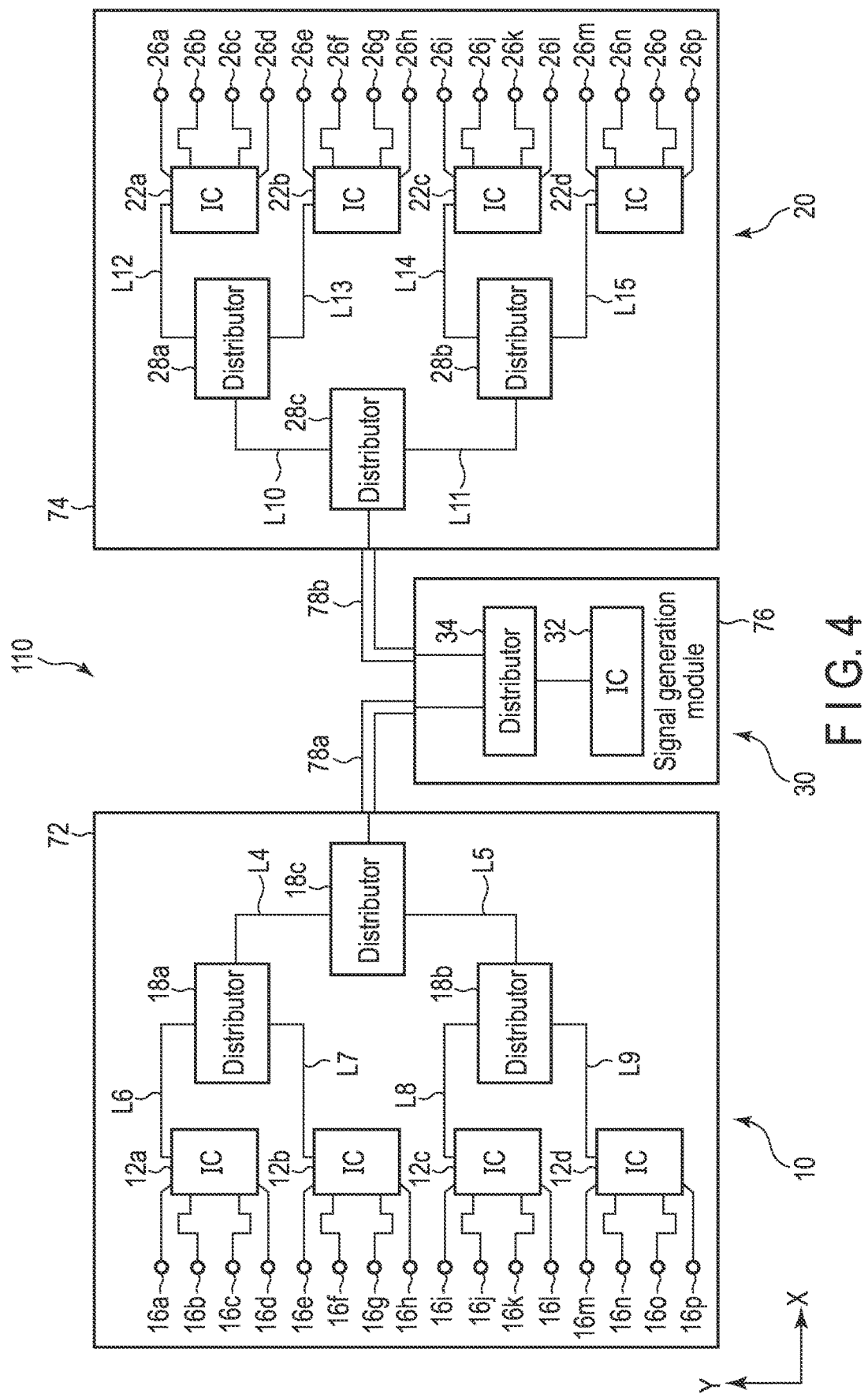
FIG. 4 is a circuit diagram illustrating an example of a transmission module, reception module, and signal generation module according to the first embodiment.

An implementation example of the radar device 110 will be described with reference to FIG. 4, FIG. 5, and FIG. 6. FIG. 4 is a plan view illustrating an implementation example of the transmission module 10, reception module 20, and signal generation module 30 in the radar device 110.

The ICs 12a to 12d and distributors 18a to 18c, which are the components of the transmission module 10, are arranged on a substrate 72. The ICs 12a to 12d are placed substantially in a straight line such that the transmission antenna elements 16a to 16p are placed in a straight line. The ICs 22a to 22d and distributors 28a to 28c, which are the components of the reception module 20, are arranged on a substrate 74. The ICs 22a to 22d are placed substantially in a straight line such that the reception antenna elements 26a to 26p are placed in a straight line. The IC 32, which is a component of the signal generation module 30, is arranged on a substrate 76.

The transmission antenna elements 16a to 16p may not be placed in a single straight line, but may be placed in a plurality of straight lines. The reception antenna elements 26a to 26p also may not be placed in a single straight line, but may be placed in a plurality of straight lines. The shape of the substrates 72, 74, and 76 may be rectangular, but is not limited to the rectangular shape. Three modules 10, 20, and 30 may not be formed on the three substrates 72, 74, and 76, respectively, but may be formed on a single substrate. Furthermore, each of the modules 10, 20, and 30 may not be formed on a single substrate, but may be formed on a plurality or substrates.

Two output terminals of the distributor 34 in the signal generation module 30 are connected to the input terminal of the distributor 18c in the transmission module 10 and the input terminal of the distributor 28c in the reception module 20 via coaxial cables 78a and 78b, respectively. The distributor 34 supplies the chirp signal to the distributor 18c via the coaxial cable 78a and the chirp signal and clock signal to the distributor 28c via the coaxial cable 78b.

In the transmission module 10, the distributor 18c is connected to the distributor 18a via a signal line L4, and is connected to the distributor 18b via a signal line L5. The distributor 18c is placed at a position substantially equidistant from the distributors 18a and 18b. Therefore, the length of the signal line L4 can easily be made substantially equal to the length of the signal line L5 without detour wiring.

The distributor 18a is connected to the IC 12a (the input terminal 40a of the transmission circuit 40) via a signal line L6 and is connected to the IC 12b (the input terminal 40a of the transmission circuit 40) via a signal line L7. The distributor 18a is placed at a position substantially equidistant from the ICs 12a and 12b. Therefore, the length of the signal line L6 can easily be made substantially equal to the length of the signal line L7 without detour wiring.

The distributor 18b is connected to the IC 12c (the input terminal 40a of the transmission circuit 40) via a signal line L8 and is connected to the IC 12d (the input terminal 40a of the transmission circuit 40) via a signal line L9. The distributor 18b is placed at a position substantially equidistant from the ICs 12c and 12d. Therefore, the length of the signal line L8 can easily be made substantially equal to the length of the signal line L9 without detour wiring.

The lengths of the signal lines between the signal generation module 30 and the input terminals 40a of the transmission circuits 40 in four ICs 12a to 12d can easily be made substantially equal by thus dividing the chirp signal supplied from the signal generation module 30 to the transmission module 10 into two signals by the distributor 18c and further dividing each of the two divisional signals into two signals. Therefore, variation in the transmission delay of the chirp signals input to the transmission circuits 40 in the ICs 12a to 12d can be suppressed. Furthermore, designing the transmission module 10 is facilitated since detour wiring of the signal lines is unnecessary, and decrease in the dynamic range can be prevented since signal attenuation caused by the detour does not occur.

In the reception module 20, the distributor 28c is connected to the distributor 28a via a signal line L10, and is connected to the distributor 28b via a signal line L11. The distributor 28c is placed at a position substantially equidistant from the distributors 28a and 28b. Therefore, the length of the signal line L10 can easily be made substantially equal to the length of the signal line L11 without detour wiring.

The distributor 28a is connected to the IC 22a (the input terminal 50a of the reception circuit 40) via a signal line L12 and is connected to the IC 22b (the input terminal 50a of the reception circuit 40) via a signal line L13. The distributor 28a is placed at a position substantially equidistant from the ICs 22a and 22b. Therefore, the length of the signal line L12 can easily be made substantially equal to the length of the signal, line L13 without detour wiring.

The distributor 28b is connected to the IC 22c (the input terminal 50a of the reception circuit 40) via a signal line L14 and is connected to the IC 22d (the input terminal 50a of the reception circuit 40) via a signal line L15. The distributor 28b is placed at a position substantially equidistant from the ICs 22c and 22d. Therefore, the length of the signal line L14 can easily be made substantially equal to the length of the signal line L15 without detour wiring.

The lengths of the signal lines between the signal generation module 30 and the input terminals 50a of the reception circuits 50 in the four ICs 22a to 22d can easily be made substantially equal by thus dividing each of the chirp signal and the clock signal supplied from the signal generation module 30 to the reception module 20 into two signals by the distributor 28c and further dividing each of the two divisional signals into two signals. Therefore, variation in the transmission delay of the chirp signals supplied to the reception circuits 50 in the ICs 12a to 12d and variation in the timing shift of the clock signals can be suppressed. Furthermore, designing the reception module 20 is facilitated since detour wiring of the signal lines is unnecessary, and decrease in the dynamic range can be prevented since signal attenuation caused by the detour does not occur.

The arrangement of the transmission module 10 and the reception module 20 is not limited to the arrangement shown in FIG. 4. When the transmission module 10 and the reception module 20 are respectively placed on the left and right sides of the signal generation module 30 as shown in FIG. 4, the transmission antenna elements 16a to 16p are fed along the X axis from a positive side to a negative side, and the reception antenna elements 26a to 26p are fed along the X axis from the negative side to the positive side. The feeding direction of the transmission antenna elements 16a to 16p and the feeding direction of the reception antenna elements 26a to 26p are reversed. Therefore, the horizontal polarization wave transmitted from the transmission antenna elements 16a to 16p and the horizontal polarization wave received by the reception antenna elements 26a to 26p are reversed in phase. The reversed phase relationship between transmission and reception of the horizontal polarization wave can be eliminated by electrically adjusting the phase of the reception signal by a phase shifter in the transmission circuit 40 or a phase shifter in the reception circuit 50. The reversed phase relationship between transmission and reception of the horizontal polarization can also be compensated for by reversing the phase of the reception signal by the processor 90.

Alternatively, the arrangement of the transmission module 10 and the reception module 20 may be adjusted such that the transmission module 10 and the reception module 20 can be fed in the same direction and the same direction. For example, if the substrate 72 of the transmission module 10 or the substrate 74 of the reception module 20 is horizontally flipped, i.e., the substrate 72 or 74 are right and left reversed, the feeding directions of the transmission antenna elements 16a to 16p and the reception antenna elements 26a to 26p can be made the same and the directions thereof can also be made the same.

Figure 5:
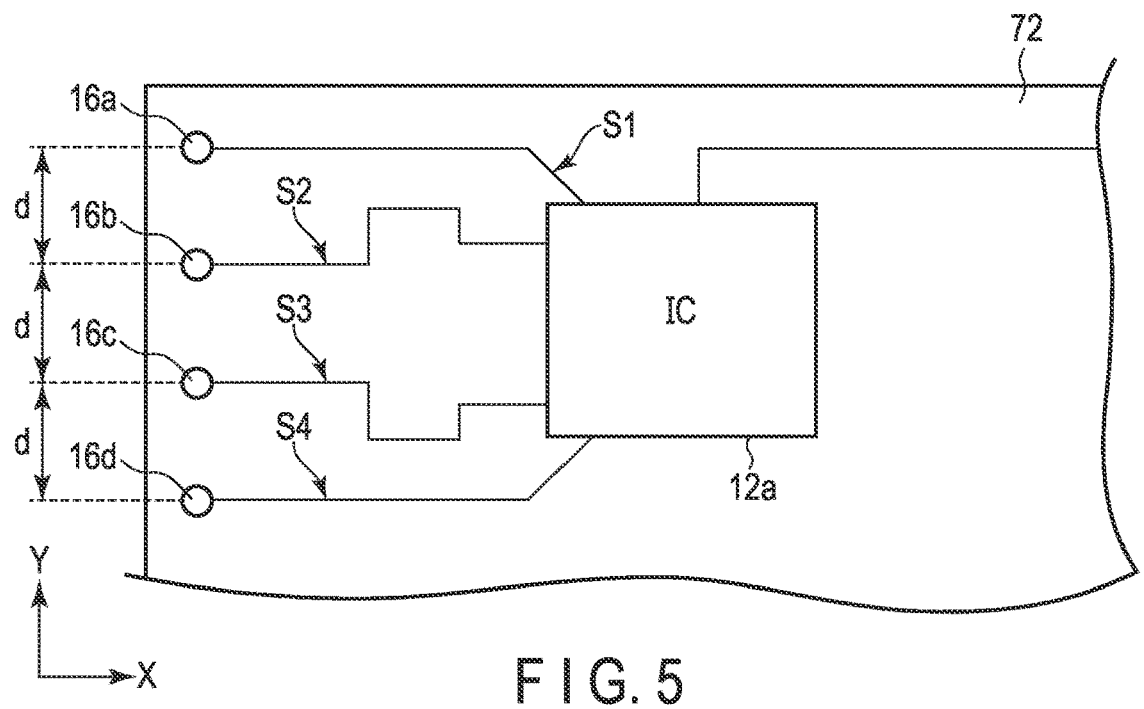
FIG. 5 is a circuit diagram illustrating a detailed example of a transmission module according to the first embodiment.

FIG. 5 is an enlarged view of an upper left part of the transmission module 10 of FIG. 4, illustrating an example of the connection between the IC 12a and the transmission antenna elements 16a to 16d.

The transmission antenna element 16a is connected to the transmission amplifier 42a in the transmission circuit 40 in the IC 12a via a signal line S1. The transmission antenna element 16b is connected to the transmission amplifier 42b in the transmission circuit 40 via a signal line S2. The transmission antenna element 16c is connected to the transmission amplifier 42c in the transmission circuit 40 via a signal line S3. The transmission antenna element 16d is connected to the transmission amplifier 42d in the transmission circuit 40 via a signal line S4. An interval d between two of the transmission antenna elements 16a to 16d may be one wavelength, a half wavelength or any other wavelength.

The lengths of the signal lines S1, S2, S3, and S4 are substantially equal to each other. Therefore, the lengths of four signal lines from the signal generation circuit 60 in the IC 32 in the signal generation module 30 to the transmission antenna elements 16a to 16d are substantially equal to each other.

Connection between the other ICs 12b to 12d in the transmission module 10 and the transmission antenna elements are also made in the same manner.

Figure 6:
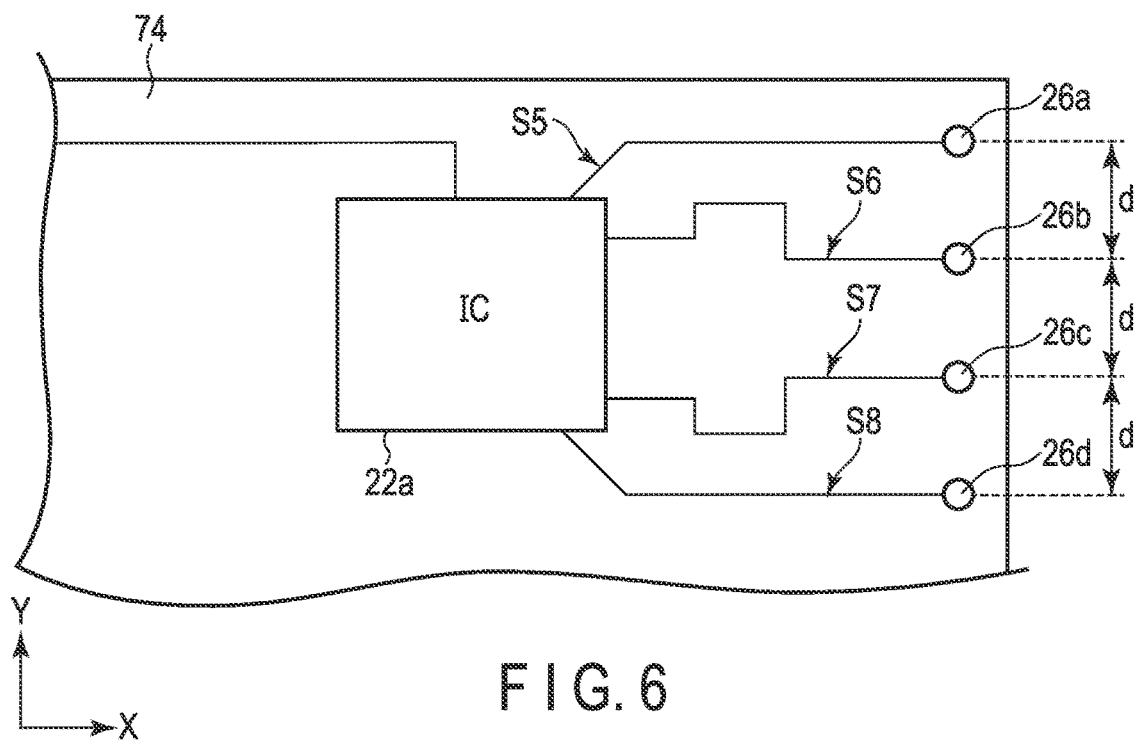
FIG. 6 is a circuit diagram illustrating a detailed example of a reception module according to the first embodiment.

FIG. 6 is an enlarged view of an upper right part of the reception module 20 in FIG. 4, illustrating an example of the connection between the IC 22a and the reception antenna elements 26a to 26d.

The reception antenna element 26a is connected to the reception amplifier 52a in the reception circuit 50 in the IC 22a via a signal line S5. The reception antenna element 26b is connected to the reception amplifier 52b in the reception circuit 50 via a signal line S6. The reception antenna element 26c is connected to the reception amplifier 52c in the reception circuit 50 via a signal line S7. The reception antenna element 26d is connected to the reception amplifier 52d in the reception circuit 50 via a signal line S8. An interval d between two of the reception antenna elements 26a to 26d may be one wavelength, a half wavelength or any other wavelength.

The lengths of the signal lines S5, S6, S7, and S8 are substantially equal to each other. Therefore, the lengths of four signal lines from the signal generation circuit 60 in the IC 32 in the signal generation module 30 to the reception antenna elements 26a to 26d are substantially equal to each other.

Connection between the other ICs 22b to 22d in the reception module 20 and the reception antenna elements are also made in the same manner.

According to the radar device 110 of the first embodiment, the transmission array antenna and the reception array antenna having large aperture lengths are formed by serially connecting the ICs having the radar functions. Therefore, the radar device 110 having a high spatial resolution is formed. The radar device 110 is applicable to applications that require high-resolution direction estimation and high-definition imaging. The aperture lengths of the transmission array antenna and the reception array antenna can easily be increased by increasing the ICs to be connected in series.

Each of the ICs includes the signal generation circuit 60, but transmission ICs that transmit electromagnetic waves by the transmission array antennas and reception ICs that receive electromagnetic waves by the reception array antennas do not use the signal generation circuit 60. A first IC (signal generation IC) using only the signal generation circuit 60 is provided. In the signal generation IC, the output terminal 60a is connected to the transmission ICs and reception ICs but the input terminals 40a and 50a are not connected to the transmission ICs and reception ICs. The output signal of the signal generation IC is supplied to the transmission ICs and reception ICs. Therefore, synchronization of the transmission ICs with the reception ICs is ensured.

Furthermore, the output signal of the signal generation IC is distributed to the transmission ICs and reception ICs via substantially equal-length signal lines. In each of the transmission ICs, the input signal is distributed to the transmission antenna elements via the substantially equal-length signal lines. In each of the reception ICs, the input signal is distributed to signal processing units of the reception signals via the substantially equal-length signal lines. Therefore, synchronization control is performed with high precision, interference between transmission waves is prevented, and reception processing such as mixing of the reception signal and chirp signal can be performed in synchronization with the transmission timing. In addition, since the transmission circuits and reception circuits of antenna elements are connected to the signal generation IC via the substantially equal-length signal lines, phase control at the array processing can be accurately performed, and the directivity of the array antenna can be accurately controlled.

Second Embodiment

Figure 7:
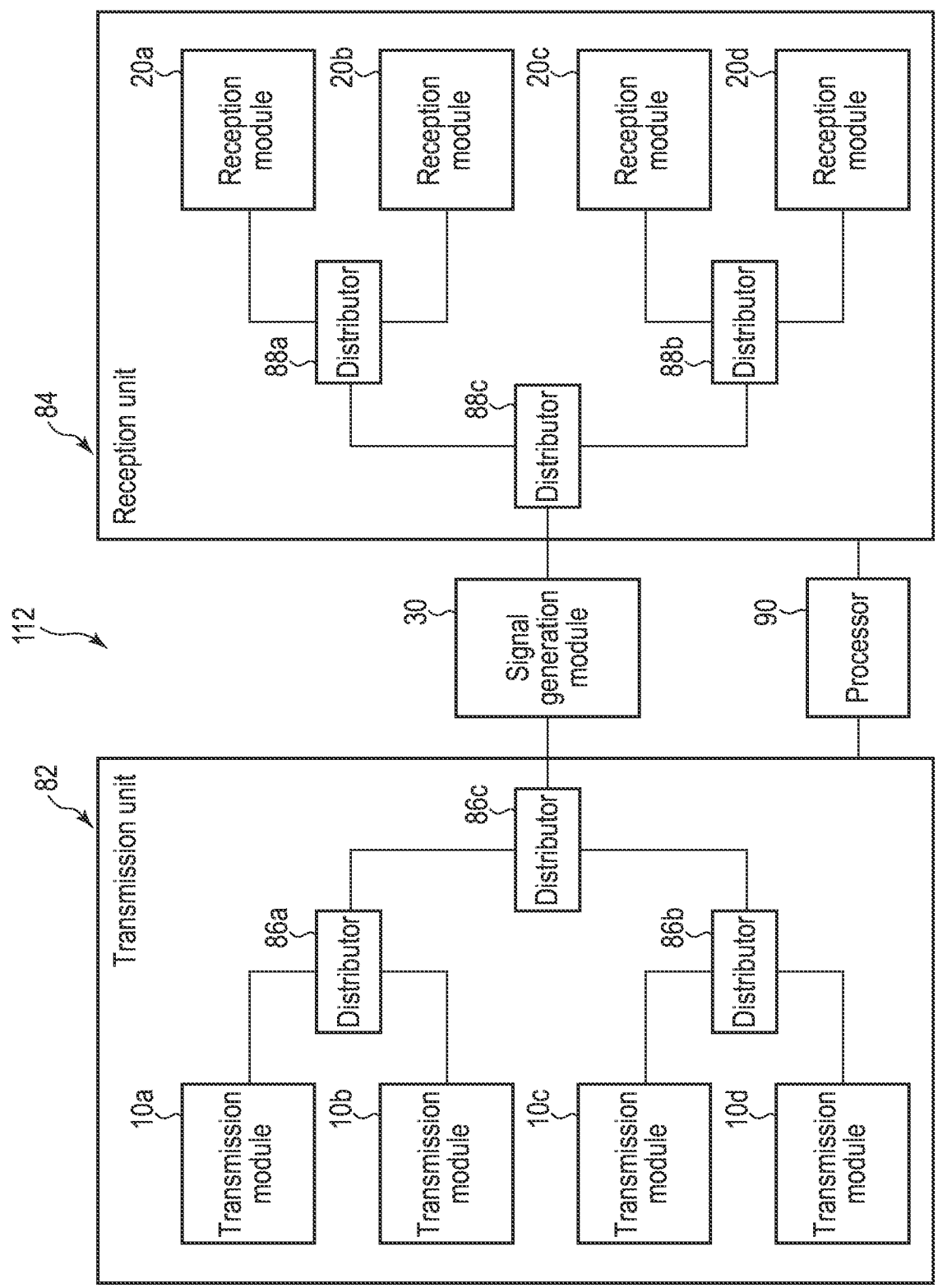
FIG. 7 is a circuit diagram illustrating an example of a radar device according to a second embodiment.

A radar device 112 according to a second embodiment will be described with reference to FIGS. 7 to 13. FIG. 7 is a circuit diagram illustrating an example of a radar device 112. The radar device 112 includes a transmission unit 82, a reception unit 84, and the signal generation module 30. The radar device 112 is connected to the processor 90.

The transmission unit 82 includes transmission modules 10a, 10b, 10c, and 10d, and distributors 86a, 86b, and 86c. Each of the transmission modules 10a, 10b, 10c, and 10d is equivalent to the transmission module 10 of the first embodiment. The number of transmission modules included in the transmission unit 82 is not limited to four, but may be any number as long as it is plural. The distributor 86c outputs the chirp signal from the signal generation module 30 to the distributors 86a and 86b. The distributor 86a outputs the signal from the distributor 86c to the transmission modules 10a and 10b. The distributor 86b outputs the chirp signal from the distributor 86c to the transmission modules 10c and 10d.

The distributor 86c is placed at a position substantially equidistant from the distributors 86a and 86b. The distributer 86a is placed at a position substantially equidistant from the transmission modules 10a and 10b. The distributor 86b is placed at a position substantially equidistant from the transmission modules 10c and 10d. Therefore, the chirp signal from the signal generation module 30 is supplied to each of the transmission modules 10a to 10d via signal lines having substantially equal-lengths.

The reception unit 84 includes reception modules 20a, 20b, 20c, and 20d and distributors 88a, 88b, and 88c. Each of the reception modules 20a, 20b, 20c, and 20d is equivalent to the reception module 20 of the first embodiment. The number of reception modules included in the reception unit 84 is not limited to four, but may be any number as long as it is plural. A distributor 88c distributes the chirp signal and clock signal from the signal generation module 30 to the distributors 88a and 88b. The distributor 88a outputs the chirp signal and clock signal from the distributor 88c to the reception modules 20a and 20b. The distributer 88b outputs the chirp signal and clock signal from distributer 88c to the reception modules 20c and 20d.

The distributor 88c is placed at a position substantially equidistant from the distributors 88a and 88b. The distributer 88a is placed at a position substantially equidistant from the reception modules 20a and 20b. The distributor 88b is placed at a position substantially equidistant from the reception modules 20c and 20d. Therefore, the chirp signal and clock signal from the signal generation module 30 are supplied to each of the reception modules 20a to 20d via signal lines having substantially equal-lengths.

The transmission modules 10a, 10b, 10c, and 10d and the reception modules 20a, 20b, 20c, and 20d are connected to the processor 90.

Figure 8:
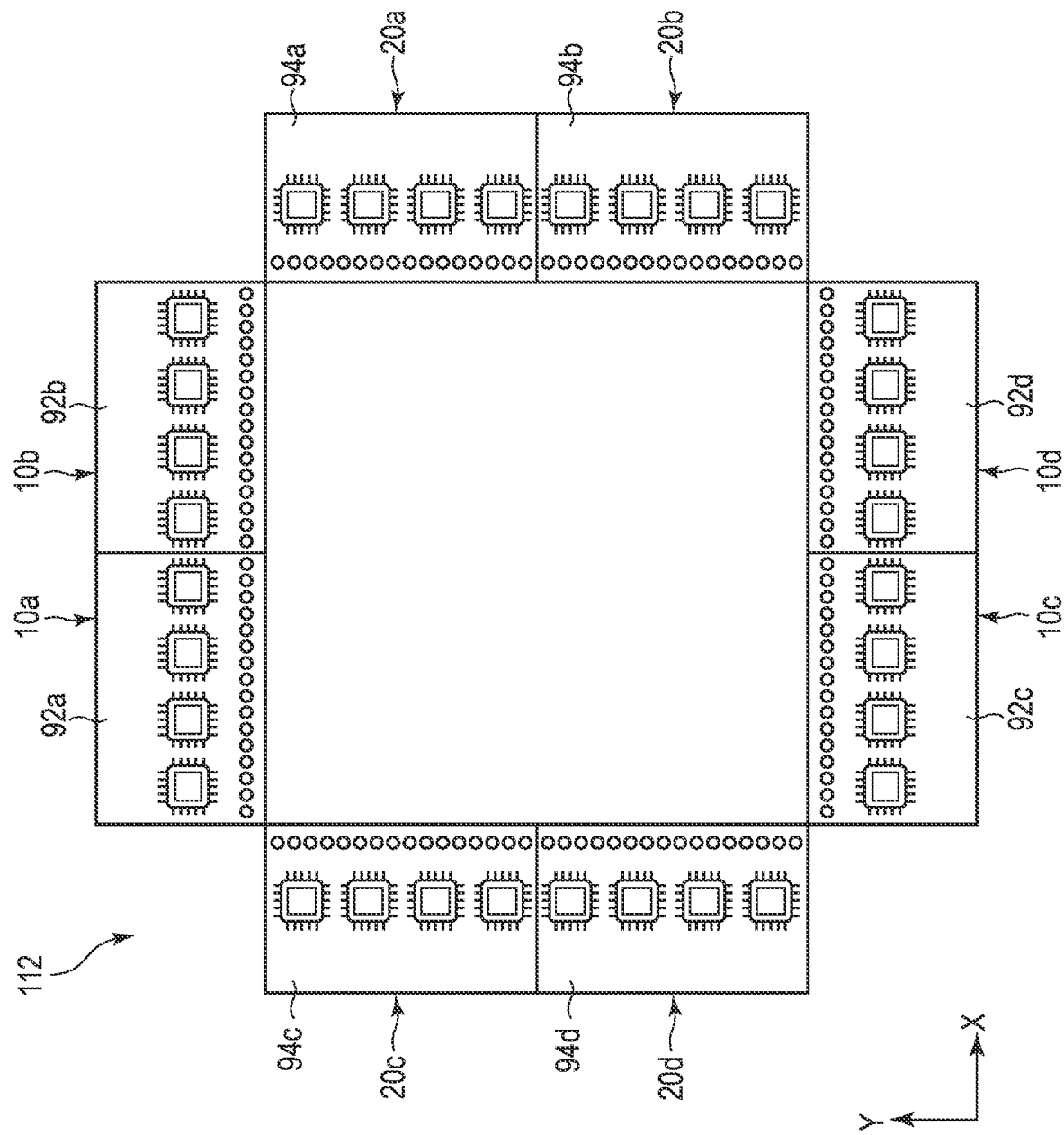
FIG. 8 is a circuit diagram illustrating an implementation example of a radar device according to the second embodiment.

FIG. 8 is a plan view illustrating an implementation example of the radar device 112. The transmission modules 10a, 10b, 10c, and 10d are arranged on rectangular substrates 92a, 92b, 92c, and 92d, respectively. The reception modules 20a, 20b, 20c, and 20d are arranged on rectangular substrates 94a, 94b, 94c, and 94d, respectively. Every two of the substrates 92a to 92d and 94a to 94d are placed along four sides of a square area.

The transmission antenna elements are placed along the X direction at the outer periphery of the square area. For example, a pair of substrates 92a and 92b are placed adjacent to each other along an upper side of the square area and a pair of substrates 92c and 92d are placed adjacent to each other along a lower side of the square area. The reception antenna elements are placed in the Y direction at the outer periphery of the square area. For example, a pair of substrates 94a and 94b are placed adjacent to each other along a right side of the square area and a pair of substrates 94c and 94d are placed adjacent to each other along a left side of the square area.

Sixty-four transmission antenna elements on four substrates 92a, 92b, 92c, and 92d form one transmission array antenna, and sixty-four reception antenna elements on four substrates 94a, 94b, 94c, and 94d form one reception array antenna.

Since transmission and reception are compatible, the substrates 94a to 94d of the reception modules 20a to 20d may be placed adjacent to each other along the X direction such that the reception array antenna is placed along the X direction, and the substrates 92a to 92d of the transmission modules 10a to 10d may be placed adjacent to each other in the Y direction such that the transmission array antenna is placed in the Y direction, unlike the example of FIG. 8.

The signal generation module 30 can be placed at any place, though not shown in the figure. For example, the signal generation module 30 may be placed inside the square area and connected to the transmission modules 10a to 10d and the reception modules 20a to 20d via a plurality of coaxial cables having substantially equal-lengths. Alternatively, the signal generation module 30 may be placed outside the transmission modules 10a to 10d and the reception modules 20a to 20d.

FIG. 9 is a view illustrating an example of arrangement of transmission antenna elements in a pair of adjacent transmission modules of the radar device 112. FIG. 9 illustrates examples of the transmission antenna elements on the substrates 92a and 92b of the transmission modules 10a and 10b. The transmission antenna elements 16a to 16p on the substrate 92a are placed at intervals d along the X direction. The interval d may be one wavelength, a half wavelength, or any other wavelength. The transmission antenna elements 16a to 16p on the substrate 92b are also placed at the interval d along the X direction.

To form the transmission array antenna, in a case where the substrates 92a and 92b are placed adjacent to each other along the direction such that the antenna elements 16a to 16p are placed along the X direction, a distance between the rightmost transmission antenna element 16p on the substrate 92a and the leftmost transmission antenna element 16a on the substrate 92b also needs be the interval d. Therefore, in each substrate 92a or 92b, the antenna element 16p or 16a closest to the adjacent substrate 92b or 92a is placed such that a distance between the antenna element 16p or 16a closest to the side of the substrate 92b or 92a and the side is as short as possible.

The rightmost transmission antenna element 16p of the transmission antenna elements 16a to 16p on the substrate 92a is closest to the substrate 92b. The rightmost transmission antenna element 16p is placed at a second Interval d2 from a side e1 that is closest to the substrate 92b, of two sides along the Y direction of the substrate 92a. The leftmost transmission antenna element 16a of the transmission antenna elements 16a to 16p on the substrate 92b is closest to the substrate 92a. The leftmost transmission antenna element 16a is placed at a third interval d3 from a side e2 that is closest to the substrate 92a, of two sides along the Y direction of the substrate 92b. The second interval d2 and the third interval d3 are designed such that a sum of the second interval d2 and the third interval d3 is less than or equal to the interval d.

Thus, a distance between the rightmost transmission antenna element 16p on the substrate 92a and the leftmost transmission antenna element 16a on the substrate 92b can be made substantially equal to the interval d of the other antenna elements. Therefore, the transmission array antenna including thirty-two transmission antenna elements can be formed by connecting two transmission modules 10a and 10b. If the second interval d2 and the third interval d3 are both designed to be d/2, without manufacturing error, the interval d can be established by making the substrates 92a and 92b adjacent without a gap. If the second interval d2 and the third interval d3 are both designed to be somewhat smaller than d/2, the interval d can be established even with a manufacturing error.

The substrates 92c and 92d of the other pair of transmission modules 10c and 10d can also be arranged.

Since transmission and reception are compatible, the substrates 94a and 94b of the reception modules 20a and 20b may be placed adjacent to each other in the X direction such that the reception array antenna is placed in the X direction, unlike the example of FIG. 9.

FIG. 10 is a view illustrating an example of arrangement of reception antenna elements in a pair of adjacent reception modules of the radar device 112. FIG. 10 illustrates an example of the reception antenna elements on the substrates 94a and 94b of the reception modules 20a and 20b. The reception antenna elements 26a to 26p on the substrate 94a are placed at the interval d in the Y direction. The reception antenna elements 26a to 26p on the substrate 94b are also placed at the interval d in the Y direction.

To form the reception array antenna, in a case where the substrates 94a and 94b are placed adjacent to each other in the Y direction such that the antenna elements 26a to 26p are placed in the Y direction, a distance between the lowermost transmission antenna element 26p on the substrate 94a and the uppermost transmission antenna element 26a on the substrate 94b also needs be the interval d. Therefore, in each substrate 94a or 94b, the antenna element 26p or 26a closest to the adjacent substrate 94b or 94a is placed such that a distance between the antenna element 26p or 26a closest to the side of the substrate 94a or 94b and the side is as short as possible.

The lowermost reception antenna element 26p of the reception antenna elements 26a to 26p on the substrate 94a is closest to the substrate 94b. The lowermost reception antenna element 26p is placed at a fourth interval d4 from a side e3 that is closest to the substrate 94b, of two sides along the X direction of the substrate 94a. The uppermost reception antenna element 26a of the reception antenna elements 26a to 26p on the substrate 94b is closest to the substrate 94a. The uppermost reception antenna element 26a is placed at a fifth interval d5 from a side e4 that is closest to the substrate 94a, of two sides along the X direction of the substrate 94b. The fourth interval d4 and the fifth interval d5 are designed such that a sum of the fourth interval d4 and the fifth interval d5 is less than or equal to the interval d.

Thus, a distance between the lowermost transmission antenna element 26p on the substrate 94a and the uppermost transmission antenna element 26a on the substrate 94b can be made substantially equal to the interval d. Therefore, the reception array antenna including thirty-two reception antenna elements can be formed by connecting two reception modules 20a and 20b. If the fourth interval d4 and the fifth interval d5 are both designed to be d/2, without manufacturing error, the interval d can be established by making the substrates 94a and 94b adjacent without a gap. If the fourth interval d4 and the fifth interval d5 are both designed to be somewhat smaller than d/2, the interval d can be established even with a manufacturing error.

The substrates 94c and 94d of the other pair of reception modules 20c and 20d can also be designed.

Since transmission and reception are compatible, the substrates 92a and 92b of the transmission modules 10a and 10b may be placed adjacent to each other in the Y direction such that the transmission array antenna is placed in the Y direction, unlike the example of FIG. 10.

Figure 11:
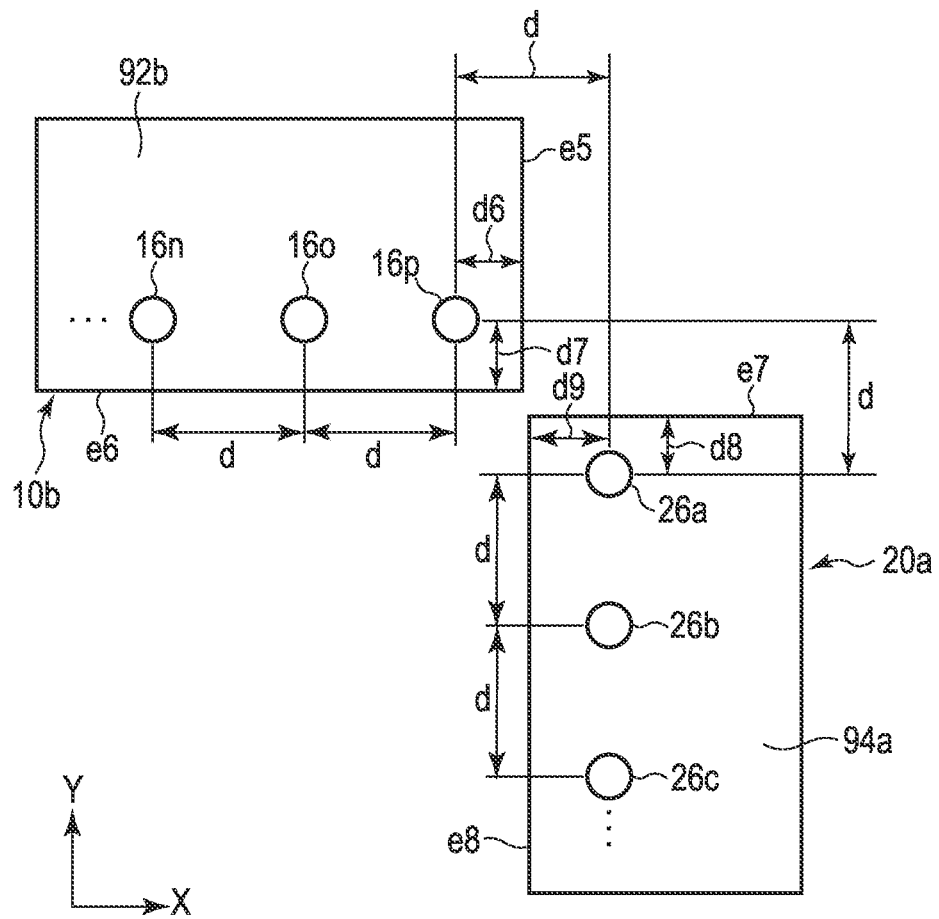
FIG. 11 is a view illustrating an example of arrangement of transmission antenna elements and reception antenna elements according to the second embodiment.

FIG. 11 is a view illustrating an example of arrangement of the transmission antenna elements in the transmission module and the reception antenna elements in the reception module, which are arranged at a corner of the square area of the radar device 112. FIG. 11 illustrates examples of the substrate 92b of the transmission module 10b and the substrate 94a of the reception module 20a, which are placed at the upper right corner of the square area.

The rightmost transmission antenna element 16p of the transmission antenna elements 16a to 16p placed at the interval d in the X direction on the substrate 92b is closet to the substrate 94a. The rightmost transmission antenna element 16p is placed at a sixth interval d6 from a side e5 which is closest to the substrate 94a, of two sides along the Y direction of the substrate 92b, and is placed at a seventh interval d7 from a side e6 which is closest to the substrate 94a, of two sides along the X direction of the substrate 92b.

The uppermost reception antenna element 26a of the reception antenna elements 26a to 26p placed at the interval d in the Y direction on the substrate 94a is closest to the substrate 92b. The uppermost reception antenna element 26a is placed at an eighth interval d8 from a side e7 which is closest to the substrate 92b, of two sides along the X direction of the substrate 94a, and is placed at a ninth interval d9 from a side e8 which is closest to the substrate 92b, of two sides along the Y direction of the substrate 94a.

The sixth interval d6 and the ninth interval d9 are designed such that a sum of the sixth interval d6 and the ninth interval d9 is less than or equal to the interval d. The seventh interval d7 and the eighth interval d8 are designed such that a sum of the seventh interval d7 and the eighth interval d8 is less than or equal to the interval d. The seventh interval d7 and the ninth interval d9 are designed such that a sum of the seventh interval d7 and the ninth interval d9 is less than or equal to the interval d. The sixth interval d6 and the eighth interval d8 are designed such that a sum of the sixth interval d6 and the eighth interval d8 is less than or equal to the interval d.

Thus, the interval in the X direction between the rightmost transmission antenna element 16p on the substrate 92b and the uppermost reception antenna element 26a on the substrate 94a can be made substantially equal to the interval d. In addition, the interval in the Y direction between the rightmost transmission antenna element 16p on the substrate 92b and the uppermost reception antenna element 26a on the substrate 94a can also be made substantially equal to the interval d. With this positional relationship established, a virtual signal point can be created at a midpoint between the positions of the transmission antenna element and the reception antenna element by the reception signal processing of the processor 90, thereby implementing a virtual array antenna.

The substrate of the transmission module and the substrate of the reception module, which are placed at other corners of the square area, can also be arranged in the same manner.

Since transmission and reception are compatible, the substrates 94a and 94b of the reception modules 20a and 20b may be placed adjacent to each other in the X direction such that the reception array antenna is arranged in the X direction, and the substrates 92a and 92b of the transmission modules 10a and 10b may be placed adjacent to each other in the Y direction such that the transmission array antenna is arranged in the Y direction, unlike the example of FIG. 11.

The arrangement relationship of FIG. 11 can also be applied to the first embodiment. That is, the transmission module 10 of the first embodiment may be placed at the position of the transmission module 10b of the second embodiment, the positional relationship between the substrate and the transmission antenna elements may be set as shown in FIG. 11. The reception module 20 of the first embodiment may be placed at the position of the reception module 20*a* of the second embodiment, and the positional relationship between the substrate and the reception antenna elements may be set as shown in FIG. 11.

Figure 12:
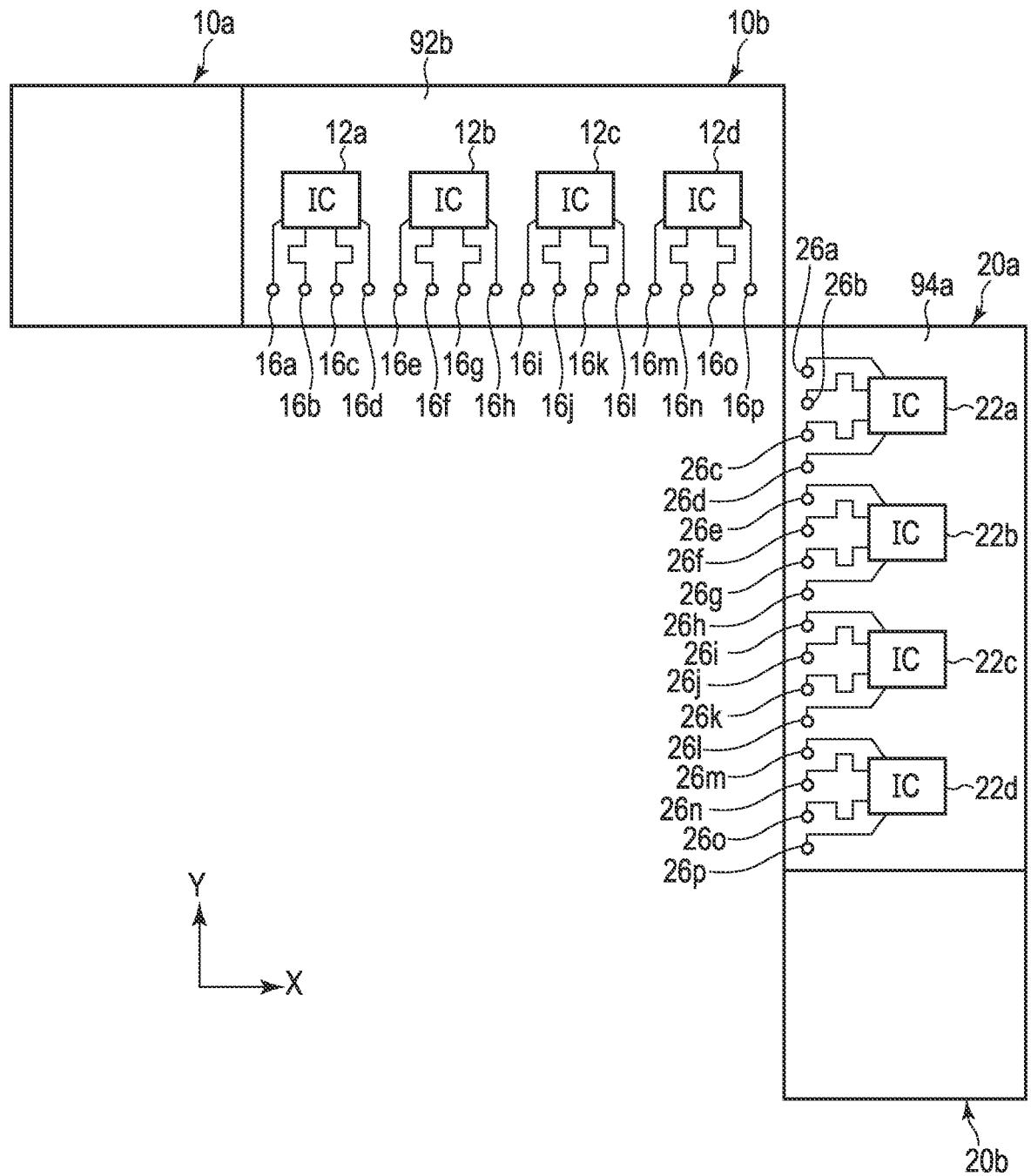
FIG. 12 illustrates an example of a feeding method of a radar device according to the second embodiment.

FIG. 12 illustrates an example of a feeding method of the radar device 112 according to the second embodiment.

On the substrate 92*b* of the transmission module 10*b*, which is placed on the upper side of the square area, the IC 12*a* and the transmission antenna elements 16*a* to 16*d* are arranged in the Y direction, the IC 12*b* and the transmission antenna elements 16*e* to 16*h* are arranged in the Y direction, the IC 12*c* and the transmission antenna elements 16*i* to 16*l* are arranged in the Y direction, and the IC 12*d* and the transmission antenna elements 16*m* to 16*p* are arranged in the Y direction. Portions of signal lines connecting the ICs 12*a* to 12*d* with the transmission antenna elements 16*a* to 16*p* are inclined with regard to the Y direction when drawn from the ICs 12*a* to 12*d*, and portions of the signal lines are in the Y direction when connected to the transmission antenna elements 16*a* to 16*p*. Thus, the transmission antenna elements 16*a* to 16*p* are fed along the Y axis from the positive side to the negative side. Therefore, each of the transmission antenna elements 16*a* to 16*p* transmits a vertically polarized wave.

The transmission module 10*a* is exactly the same as the transmission module 10*b* and transmits vertically polarized waves, which is not shown in the figures.

The transmission modules 10*c* and 10*d* also transmit vertically polarized waves, similarly to the transmission modules 10*a* and 10*b*. However, a relative position of the ICs and antenna elements in the transmission modules 10*a* and 10*b* placed on the upper side of the square area is different from a relative position of the ICs and antenna elements in the transmission modules 10*c* and 10*d* placed on the lower side of the square area. In the transmission modules 10*a* and 10*b*, the Y coordinate of the ICs 12*a* to 12*d* is more positive than the Y coordinate of the transmission antenna elements 16*a* to 16*p*. The connection points between the signal lines from the ICs 12*a* to 12*d* and the transmission antenna elements 16*a* to 16*p*, i.e., the feeding points of the transmission antenna elements 16*a* to 16*p* are located at +90 degrees when the X axis is set at 0 degrees. The transmission antenna elements 16*a* to 16*p* are fed along the Y axis from the positive side to the negative side. In contrast, in the transmission modules 10*c* and 10*d*, the Y coordinate of the ICs 12*a* to 12*d* is more negative than the Y coordinate of the transmission antenna elements 16*a* to 16*p*. The connection points between the signal lines from the ICs 12*a* to 12*d* and the transmission antenna elements 16*a* to 16*p*, i.e., the feeding points of the transmission antenna elements 16*a* to 16*p* are located at −90 degrees when the X axis is set at 0 degrees. The transmission antenna elements 16*a* to 16*p* are fed along the Y axis from the negative side to the positive side.

Therefore, the vertically polarized waves transmitted from the transmission modules 10*c* and 10*d* and the vertically polarized waves transmitted from the transmission modules 10*a* and 10*b* are reversed in phase. The phase reversal of the transmitted electromagnetic waves can be electrically compensated for by reversing the phase of the reception signal when the processor 90 processes the reception signal.

On the substrate 94*a* of the reception module 20*a*, which is placed on the right side of the square area, the IC 22*a* and the reception antenna elements 26*a* to 26*d* are arranged in the X direction, the IC 22*b* and the reception antenna elements 26*e* to 26*h* are arranged in the X direction, the IC 22*c* and the reception antenna elements 26*i* to 26*l* are arranged in the X direction, and the IC 22*d* and the reception antenna elements 26*m* to 26*p* are arranged in the X direction. Portions of signal lines connecting the ICs 22*a* to 22*d* with the reception antenna elements 26*a* to 26*p* are inclined with regard to the X direction when drawn from the ICs 22*a* to 22*d*. Portions of the signal lines are in the X direction directed to the reception antenna elements 26*a* to 26*p*. When the signal lines are connected to the reception antenna elements 26*a* to 26*p* as they are, the feeding points of the reception antenna element 26*a* to 26*p* are located at 0 degrees. The polarization direction of the reception antenna elements 26*a* to 26*p* becomes horizontal, and the vertically polarized waves transmitted from the transmission antenna elements 16*a* to 16*p* cannot be received.

Therefore, as shown in FIG. 12, the signal lines from the ICs 22*a* to 22*d* along the X direction are bent at the tip in the direction of −90 degrees to be aligned with the direction, and then connected to the reception antenna elements 26*a* to 26*p*. The connection points between the signal lines and the reception antenna elements 26*a* to 26*p*, i.e., the feeding points of the reception antenna elements 26*a* to 26*p* are located at a position of +90 degrees. The polarization direction of the reception antenna elements 26*a* to 26*p* becomes the vertical direction, and is aligned with the polarization direction of the transmission antenna elements 16*a* to 16*p*. Moreover, since the angle of the feeding points of the transmission modules 10*a*, 10*b*, 10*c*, and 10*d* matches the angle of the feeding points of the reception modules 20*a*, 20*b*, 20*c*, and 20*d*, the phases of the vertically polarized transmission waves and vertically polarized reception waves are also made to match.

Since transmission and reception are compatible, the substrates 94*a* and 94*d* of the reception modules 20*a* and 20*b* may be placed adjacent to each other along the X direction such that the reception array antenna is placed along the upper side of the square area. The substrates 92*a* and 92*b* of the transmission modules 10*a* and 10*b* may be placed adjacent to each other in the Y direction such that the transmission array antenna is placed along the right side of the square area, unlike the example of FIG. 12.

FIG. 13 is a view illustrating another example of the feeding method in the radar device 112 according to the second embodiment. In the example of FIG. 12, since the angle of the feeding points of all the reception antenna elements 26*a* to 26*p* is +90 degrees, the signal lines are drawn from the reception antenna elements 26*a* to 26*p*, from the negative side to the positive side along the Y axis. A distance d8 between the reception antenna element 26*a* closest to the upper end side of the substrate 94*a* and the upper end side is narrow as shown in FIG. 11. Therefore, it may be difficult to draw the signal lines out of the antenna element 26*a* in the direction of +90 degrees. In the example of FIG. 13, the signal lines from the ICs 22*c* and 22*d* in the X direction are bent at the tip in the direction of −90 degrees to be aligned with a line parallel to the Y axis as shown in FIG. 12 and then connected to the reception antenna elements 26*i* to 26*p*. The signal lines from the ICs 22*a* and 22*b* in the X direction are bent at the tip in the direction of +90 degrees to be aligned with a line parallel to the Y axis, oppositely to the state shown in FIG. 12, and then connected to the reception antenna elements 26*a* to 26*h*. Therefore, the reception antenna elements 26*a* and 26*p* at the end parts of the substrate 94*a* can secure space to draw the signal lines to the end sides.

The feeding points of the reception antenna elements 26*a* to 26*h* are located at a position of −90 degrees, and the feeding points of the reception antenna elements 26*i* to 26*p* are located at a position of +90 degrees. The feeding direction of the reception antenna elements 26a to 26h and the feeding direction of the reception antenna elements 26i to 26p are reversed in phase. Therefore, the vertically polarized waves received by the reception antenna elements 26a to 26h are reversed in phase from the vertically polarized waves received by the reception antenna elements 26i to 26p. The vertically polarized waves received by the reception antenna elements 26a to 26h are also reversed in phase from the vertically polarized waves transmitted by the transmission antenna elements 16a to 16p.

The outputs of the reception modules 20a to 20d are supplied to the processor 90. The processor 90 processes outputs of the ADCs 56a to 56d in the reception modules 20a to 20d. Furthermore, the processor 90 reverses the phase of the reception signals of the reception antenna elements 26a to 26h in the output signals of the reception modules 20a to 20d. The phase of the vertically polarized waves received by the reception antenna elements 26a to 26h can be thereby aligned with the phase of the vertically polarized waves transmitted by the transmission antenna elements 16a to 16p. Instead of reversing the phase by the processor 90, the phase of the reception signals of the reception antenna elements 26a to 26h can be reversed by phase shifters in the reception circuits 50 of the receive modules 20a to 20d.

Since transmission and reception are compatible, the substrates 94a and 94b of the reception modules 20a and 20b may be placed adjacent to each other in the X direction such that the reception array antenna is arranged in the X direction, and the substrates 92a and 92b of the transmission modules 10a and 10b may be placed adjacent to each other in the Y direction such that the transmission array antenna is arranged in the Y direction, unlike the example of FIG. 13.

According to the radar device 112 of the second embodiment, spatial resolution can be further improved by connecting the transmission modules 10 of the first embodiment, and connecting the reception modules 20 of the first embodiment. In addition, the intervals of the antenna elements between adjacent substrates can also be a uniform interval, similarly to the other intervals, by narrowing the interval between an antenna element closest to the side of substrate and the side is as short as possible. Furthermore, since the signal lines from the ICs are connected to the antenna elements such that both of the feeding directions and angles of the feeding points are aligned, the polarization directions and phases of the transmission module 10 and the reception module 20 can be aligned.

Figure 14:
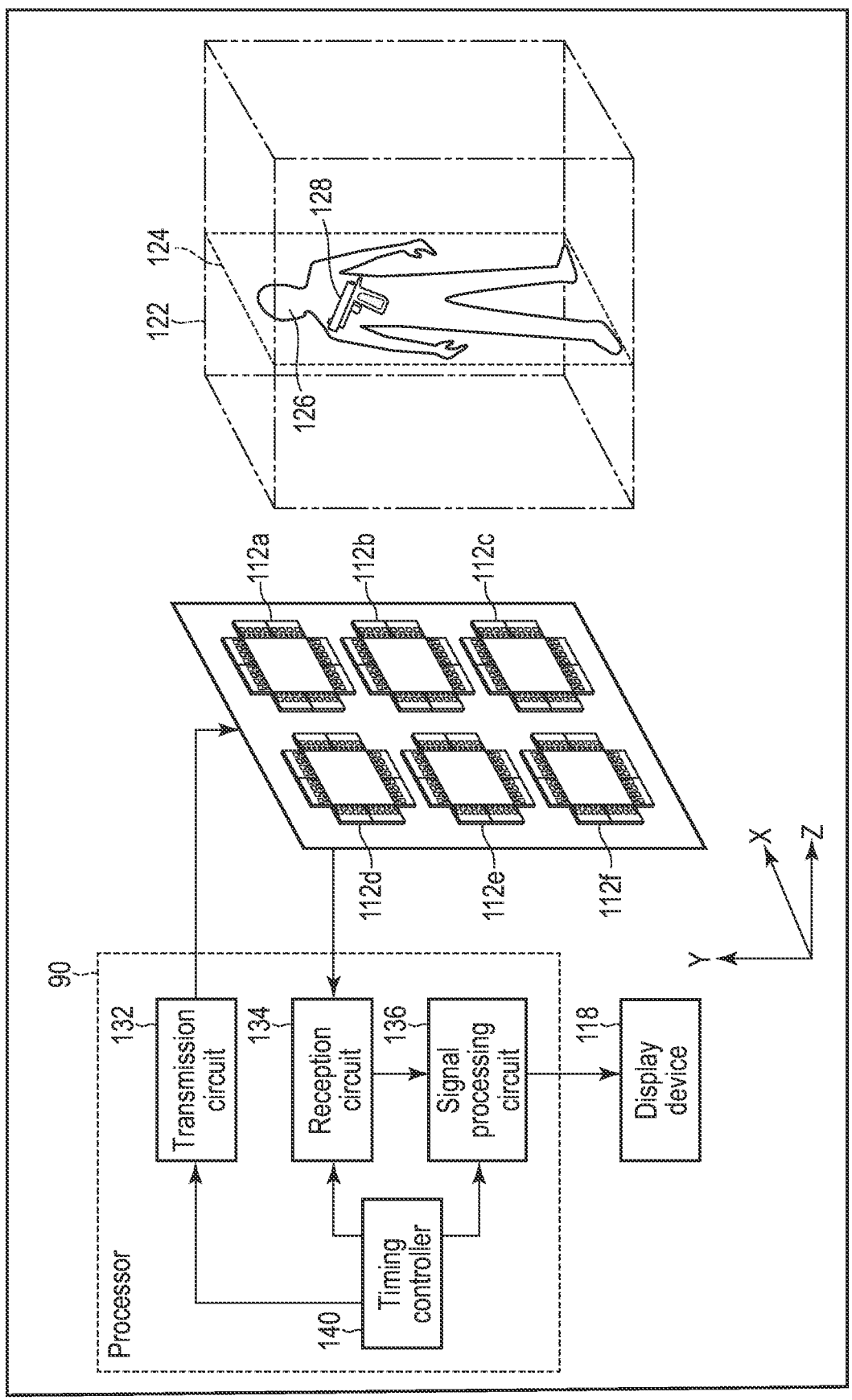
FIG. 14 is a circuit diagram illustrating an example of a radar system including a radar device according to the first or second embodiment.

FIG. 14 illustrates a radar system, i.e., an application example of the radar devices 110 and 112 according to the embodiments. The radar system is formed of the radar device 110 or 112, processor 90, and a display device 118. The radar device 110 or 112 is placed on the X-Y plane to be opposed to an inspection plane (X-Y plane) 124 of a target object (for example, human being) 126. The size of the radar device 110 or 112 depends on the size of the object 126. Therefore, when the size of the object 126 is large, for example, one radar device 112 shown in FIG. 8 may not be able to inspect the entire object 126. In this case, for example, a plurality of (six, in this case) radar devices 112a, 112b, 112c, 112d, 112e, and 112f corresponding to the radar device 112 shown in FIG. 8 may be arranged on the plane to form a radar device of a large size as a whole. Alternatively, the number of substrates placed around the outer periphery of the square area of the radar device 112 shown in FIG. 8 may be increased to form one large radar device.

The processor 90 can calculate an image of the object 126 in the inspection plane 124 parallel to the radar devices 112a to 112f, which is the plane in a three-dimensional space located in the direction of transmission of the electromagnetic waves transmitted from the radar devices 112a to 112f. The position of the inspection plane 124 from which the image is obtained depends on the time between transmission and reception of the electromagnetic waves. A three-dimensional image of the object 126 can be obtained by setting the times between transmission and reception of the electromagnetic waves in accordance with positions of a number of inspection surfaces 124 in the three-dimensional space 122 and obtaining images of the inspection surfaces 124 at a number of different positions. One example of the use of this radar system is the body checking of users of airports, train stations, and the like.

The processor 90 includes a transmission circuit 132 and a reception circuit 134 connected to each of the antennas included in the radar device 112. The transmission circuit 132 controls the transmission modules 10a to 10d, and the reception circuit 134 controls the reception modules 20a to 20d.

The transmission circuit 132 and the reception circuit 134 are controlled by a timing controller 140. The transmission circuit 132 and the reception circuit 134 are connected to the timing controller 140 by a wired line or wireless circuit. The timing controller 140 controls a transmission frequency, bandwidth, and transmission timing for each antenna of the transmission circuit 132, and controls a reception timing (a time between transmission and reception) for each antenna of the reception circuit 134. The reception signal of one antenna element corresponds to an image signal of one pixel of the object 126. The timing controller 140 sequentially changes the antennas (also referred to as scanning) and changes the reception timing. The reflected wave of the object 126, of the electromagnetic wave transmitted from each transmit antenna is received by the receive antenna.

The reception signal that is received by the reception circuit 134 is supplied to a signal processing circuit 136. The signal processing circuit 136 generates an image signal indicating a three-dimensional image of the object 126. Alternatively, the signal processing circuit 136 may generate a display signal regarding the presence or absence of a dangerous material and the degree of danger of the object 126 or the material carried by the object 126 from the reception signal that is received by the reception circuit 134. The reception circuit 134 and the signal processing circuit 136 are connected by a wired line or wireless circuit. The signal processing circuit 136 is also controlled by the timing controller 140. A time domain method, a frequency domain method, or any other algorithms can be used as an image reconstruction algorithm of the signal processing circuit 136.

The image signal generated by the signal processing circuit 136 is supplied to the display device 118 and then displayed. It can be detected that the object 126 carries a dangerous material (for example, a gun) 128 by observing this image. The signal processing circuit 136 and the display device 118 are also connected by a wired line or wireless circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The lengths and distances described herein are allowed to deviate by up to 25 percent due to the possibility of manufacturing errors or the like. The deviation in length and distance is desirably less than or equal to 10 percent.

What is claimed is:

1. A radar device comprising:
    a transmission module comprising a transmission antenna and first integrated circuits;
    a reception module comprising a reception antenna and second integrated circuits; and
    a third integrated circuit,
    wherein:
    each of the first integrated circuits comprises first transmission circuits, first reception circuits, and a first signal generation circuit;
    each of the second integrated circuits comprises second transmission circuits, second reception circuits, and a second signal generation circuit;
    the third integrated circuit comprises third transmission circuits, third reception circuits, and a third signal generation circuit;
    the third signal generation circuit is configured to supply a first signal to the first transmission circuits and the second reception circuits;
    each of the first transmission circuits is configured to transmit an electromagnetic wave corresponding to the first signal via the transmission antenna;
    each of the second transmission circuits is configured not to transmit the electromagnetic wave corresponding to the first signal;
    each of the second reception circuits is configured to receive a reception signal via the reception antenna based on the first signal; and
    each of the first reception circuits is configured not to receive the reception signal.

2. The radar device of claim 1, wherein:
    the transmission module comprises first distributors;
    the first transmission circuits are connected to the third signal generation circuit through the first distributors; and
    the first signal is supplied to the first transmission circuits through the first distributors.

3. The radar device of claim 2, wherein:
    the first distributors are connected to the first transmission circuits through signal lines; and
    lengths of the signal lines are substantially equal to each other.

4. The radar device of claim 1, wherein:
    the reception module comprises second distributors;
    the second reception circuits are connected to the third signal generation circuit through the second distributors; and
    the first signal is supplied to the second reception circuits through the second distributors.

5. The radar device of claim 4, wherein:
    the second distributors are connected to the second reception circuits through signal lines; and
    lengths of the signal lines are substantially equal to each other.

6. The radar device of claim 1, wherein:
    the transmission antenna is on a first substrate;
    the reception antenna is on a second substrate;
    the transmission antenna comprises transmission antenna elements arranged with a first interval in a first direction;
    the reception antenna comprises reception antenna elements arranged with the first interval in a second direction, the second direction being orthogonal to the first direction; and
    a distance in the second direction and between one of the transmission antenna elements closest to the second substrate and one of the reception antenna elements closest to the first substrate is equal to the first interval.

7. The radar device of claim 6, wherein a distance in the first direction and between one of the transmission antenna elements closest to the second substrate and one of the reception antenna elements closest to the first substrate is equal to the first interval.

8. The radar device of claim 1, wherein:
    the transmission antenna comprises transmission antenna elements;
    the reception antenna comprises reception antenna elements;
    the transmission antenna elements are fed in a first direction;
    a first part of the reception antenna elements is fed in the first direction;
    a second part of the reception antenna elements is fed in a reverse direction of the first direction; and
    the radar device further comprises circuitry configured to reverse a phase of a reception signal of the second part of the reception antenna elements.

9. A radar device comprising:
    a first transmission module comprising a first transmission antenna and first integrated circuits;
    a second transmission module comprising a second transmission antenna and second integrated circuits;
    a first reception module comprising a first reception antenna and third integrated circuits;
    a second reception module comprising a second reception antenna and fourth integrated circuits; and
    a fifth integrated circuit,
    wherein:
    each of the first integrated circuits comprises first transmission circuits, first reception circuits, and a first signal generation circuit;
    each of the second integrated circuits comprises second transmission circuits, second reception circuits, and a second signal generation circuit;
    each of the third integrated circuits comprises third transmission circuits, third reception circuits, and a third signal generation circuit;
    each of the fourth integrated circuits comprises fourth transmission circuits, fourth reception circuits, and a fourth signal generation circuit;
    the fifth integrated circuits comprises fifth transmission circuits, fifth reception circuits, and a fifth signal generation circuit;
    the third signal generation circuit is configured to supply a first signal to the first transmission circuits and the second reception circuits;
    each of the first transmission circuits is configured to transmit an electromagnetic wave corresponding to the first signal via the first transmission antenna;
    each of the second transmission circuits is configured not to transmit the electromagnetic wave corresponding to the first signal;
    each of the second reception circuits is configured to receive a reception signal via the second reception antenna based on the first signal; and
    each of the first reception circuits is configured not to receive the reception signal.

10. The radar device of claim 9, wherein:
the first transmission antenna is on a first substrate;
the second transmission antenna is on a second substrate;
the first transmission antenna comprises transmission antenna elements arranged with a first interval in a first direction;
the second transmission antenna comprises transmission antenna elements arranged with the first interval in the first direction; and
a distance in the first direction and between one of the transmission antenna elements on the first substrate closest to the second substrate and one of the transmission antenna elements on the second substrate closest to the first substrate is equal to the first interval.

11. The radar device of claim 9, wherein:
the first reception antenna is on a first substrate;
the second reception antenna is on a second substrate;
the first reception antenna comprises reception antenna elements arranged with a first interval in a first direction;
the second reception antenna comprises reception antenna elements arranged with the first interval in the first direction; and
a distance in the first direction and between one of the reception antenna elements on the first substrate closest to the second substrate and one of the reception antenna elements on the second substrate closest to the first substrate is equal to the first interval.

12. The radar device of claim 9, wherein:
the first transmission antenna is on a first substrate;
the first reception antenna is on a second substrate;
the first transmission antenna comprises transmission antenna elements arranged with a first interval in a first direction;
the first reception antenna comprises reception antenna elements arranged with the first interval in a second direction, the second direction being orthogonal to the first direction; and
a distance in the second direction and between one of the transmission antenna elements closest to the second substrate and one of the reception antenna elements closest to the first substrate is equal to the first interval.

13. The radar device of claim 12, wherein:
the transmission antenna elements are spaced from a side of the first substrate along the first direction by a second interval;
one of the reception antenna elements closest to the first substrate is spaced from a side of the second substrate along the second direction by a third interval; and
a sum of the second interval and the third interval is equal to the first interval.

14. The radar device of claim 9, wherein:
the first transmission antenna comprises transmission antennas;
the first reception antenna comprises reception antennas;
transmission antenna elements are fed in a first direction;
a first part of the reception antenna elements is fed in the first direction;
a second part of the reception antenna elements is fed in a reverse direction of the first direction; and
the radar device further comprises circuitry configured to reverse a phase of a reception signal of the second part of the reception antenna elements.

15. A radar system comprising:
the radar device of claim 1;
circuitry configured to perform signal processing with respect to a reception signal of the reception module; and
a display configured to display a result of the signal processing.

16. A radar system comprising:
the radar device of claim 9;
circuitry configured to perform signal processing with respect to a reception signal of the first reception module and a reception signal of the second reception module; and
a display configured to display a result of the signal processing.

* * * * *